United States Patent [19]

Efron et al.

[11] 4,455,634

[45] Jun. 19, 1984

[54] AUDIO/VIDEO QUALITY MONITORING SYSTEM

[75] Inventors: Edward Efron, Irvine; James O. McPherson, Newport Beach; Young B. Kim, Long Beach, all of Calif.

[73] Assignee: Discovision Associates, Costa Mesa, Calif.

[21] Appl. No.: 429,347

[22] Filed: Sep. 30, 1982

Related U.S. Application Data

[62] Division of Ser. No. 339,011, Jan. 12, 1982.

[51] Int. Cl.³ ............................ G11B 27/36; G11B 23/18
[52] U.S. Cl. ........................................... 369/58; 369/86; 369/91; 369/92; 381/42
[58] Field of Search ................ 369/54, 58, 86, 91–92; 381/1, 42; 324/77 R, 77 D, 77 G; 364/481, 485, 487, 553, 554

[56] References Cited

U.S. PATENT DOCUMENTS

| | | | |
|---|---|---|---|
| 3,919,479 | 11/1975 | Moon et al. | 381/42 |
| 4,084,245 | 4/1978 | Bunge | 364/485 |
| 4,184,205 | 1/1980 | Morrow | 364/508 |

Primary Examiner—Raymond F. Cardillo
Attorney, Agent, or Firm—Ronald J. Clark

[57] ABSTRACT

Method and means for evaluating the quality of audio and/or video transfer characteristics of a device upon which, or through which, audio and/or video information is contained, or passes, respectively. Both method and apparatus concern the evaluation of the quality of information transfer in the recording and playing back of a recording medium or in the transferring of audio and/or video information through an information handling device referred to as a throughput device. Unit evaluation is accomplished by establishing an input signal of known content, measuring selected parameters of selected parts of the input signal, feeding the input signal to the unit under test, measuring the parameters of parts of the output signal from the unit under test corresponding to the same selected parts of the input signal, and comparing the selected parameters of the input signal with the corresponding parameters of the output signal. Whether monitoring the quality of the signal transfer characteristics of a throughput device, a magnetic tape containing program material, or a video disc, master disc or replica, a "signature" is created for the unit under test, and subsequent analysis of the unit as it progresses along a production line or of a copy made on the same or alternate recording medium results in a second "signature" which is compared against the first signature to make a determination as to the quality of the signal handling or transfer characteristics of the unit. In this manner, out-of-tolerance conditions can be automatically detected, thereby eliminating subjectivity and providing consistency in the quality level of device testing.

6 Claims, 28 Drawing Figures

FIG. 4 – AUDIO TEST SUBSYSTEM

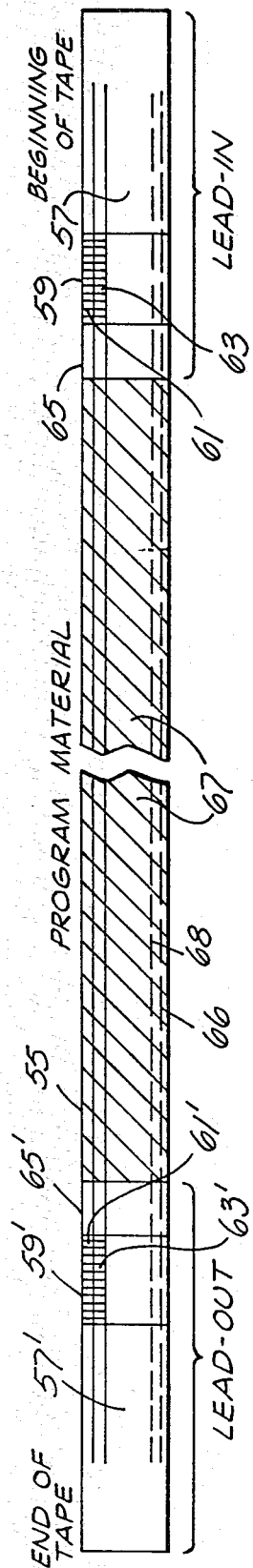
FIG. 5
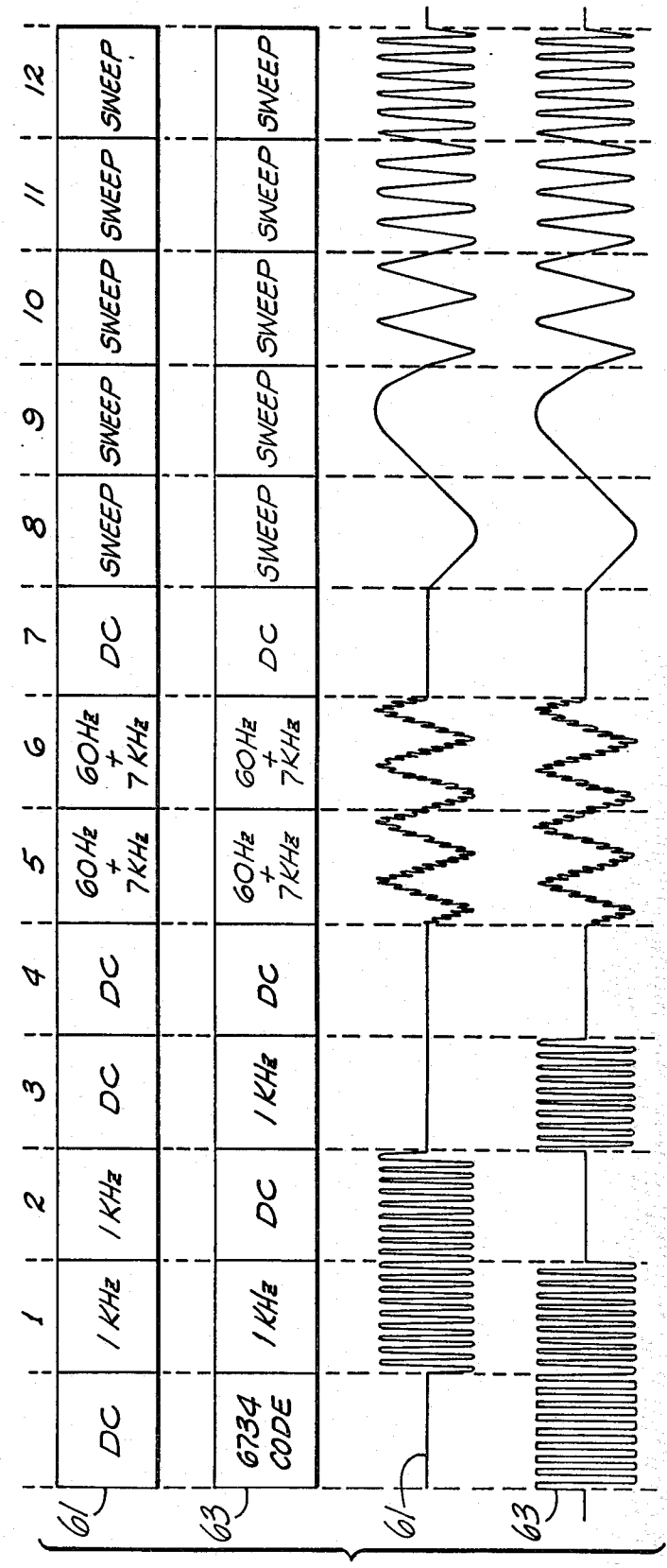
FIG. 6 — AUDIO TEST TONE PLACEMENT.

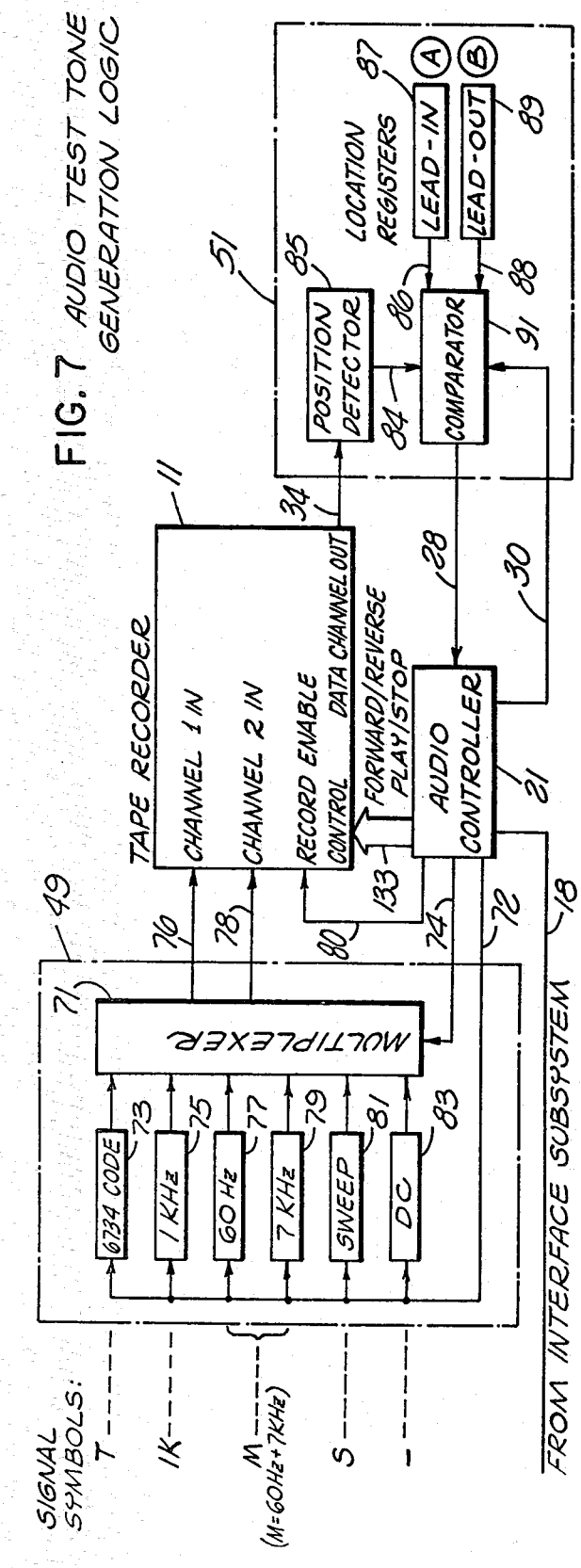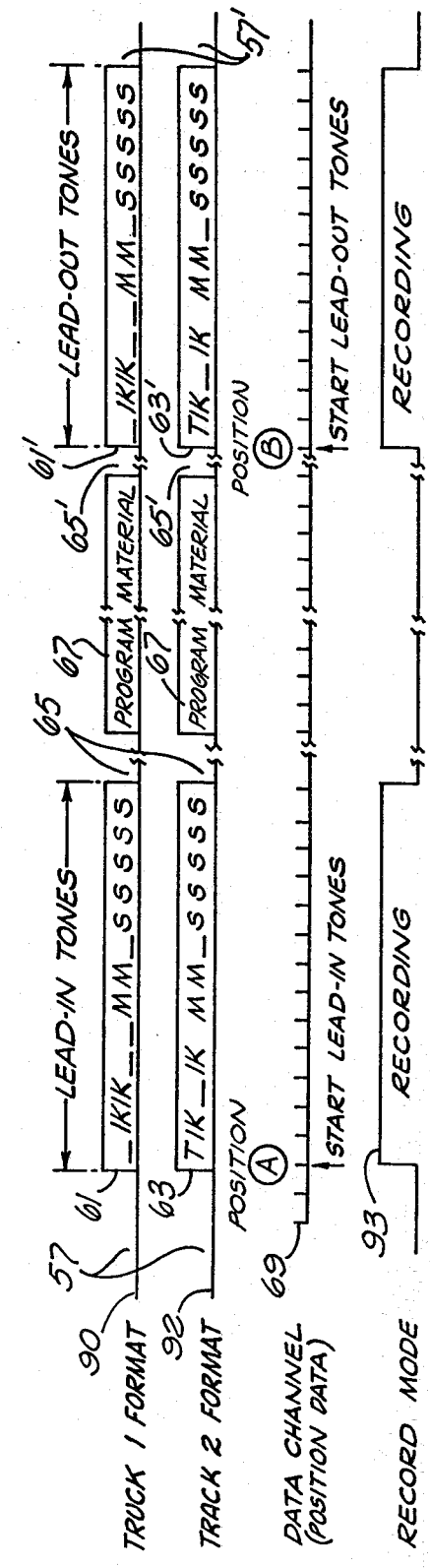
FIG. 7 AUDIO TEST TONE GENERATION LOGIC
FIG. 8 AUDIO TEST TONE GENERATION TIMING

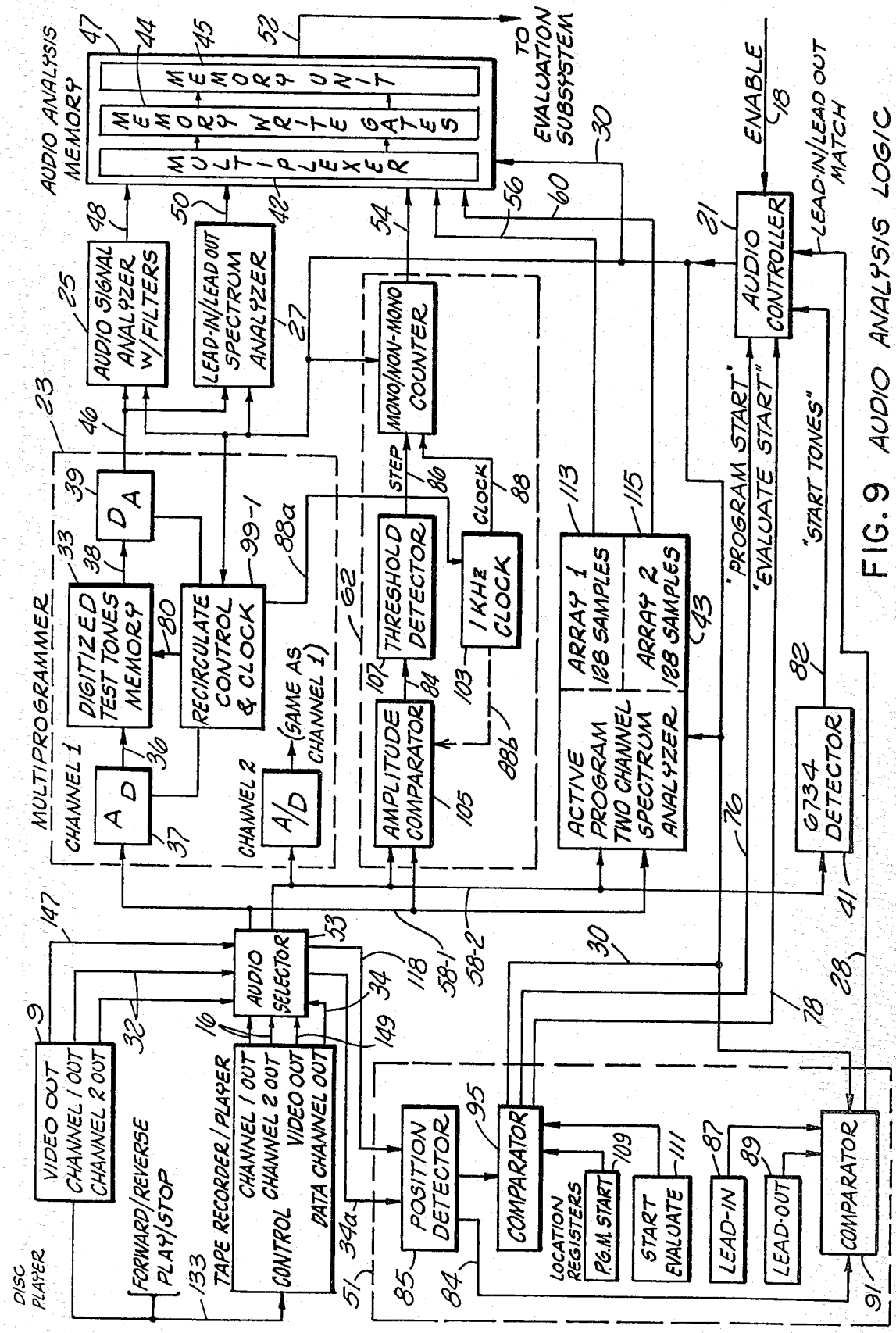
FIG. 9 AUDIO ANALYSIS LOGIC

FIG. 13 AUDIO ANALYSIS TIMING.

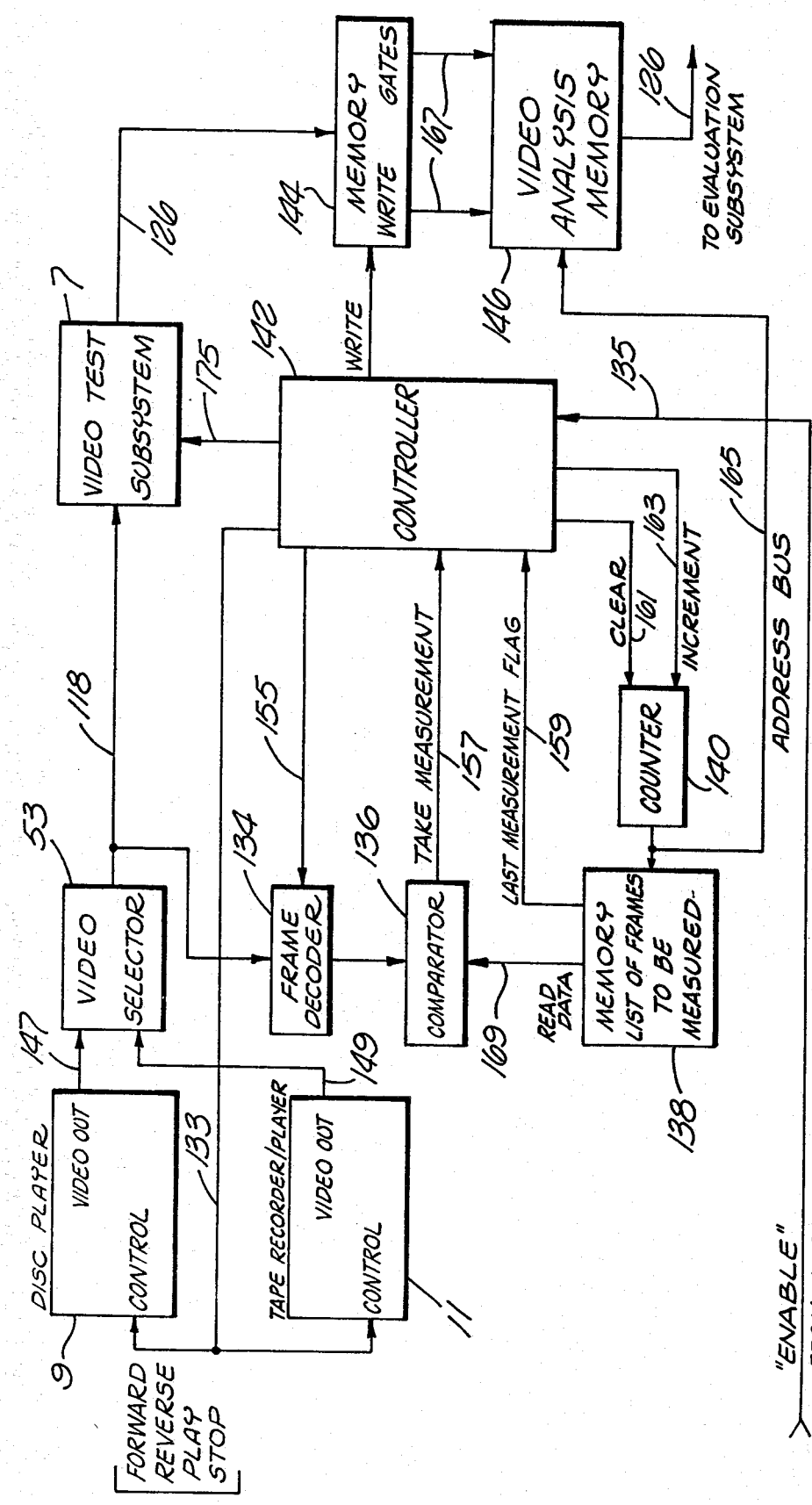
FIG. 22 VIDEO ANALYSIS LOGIC

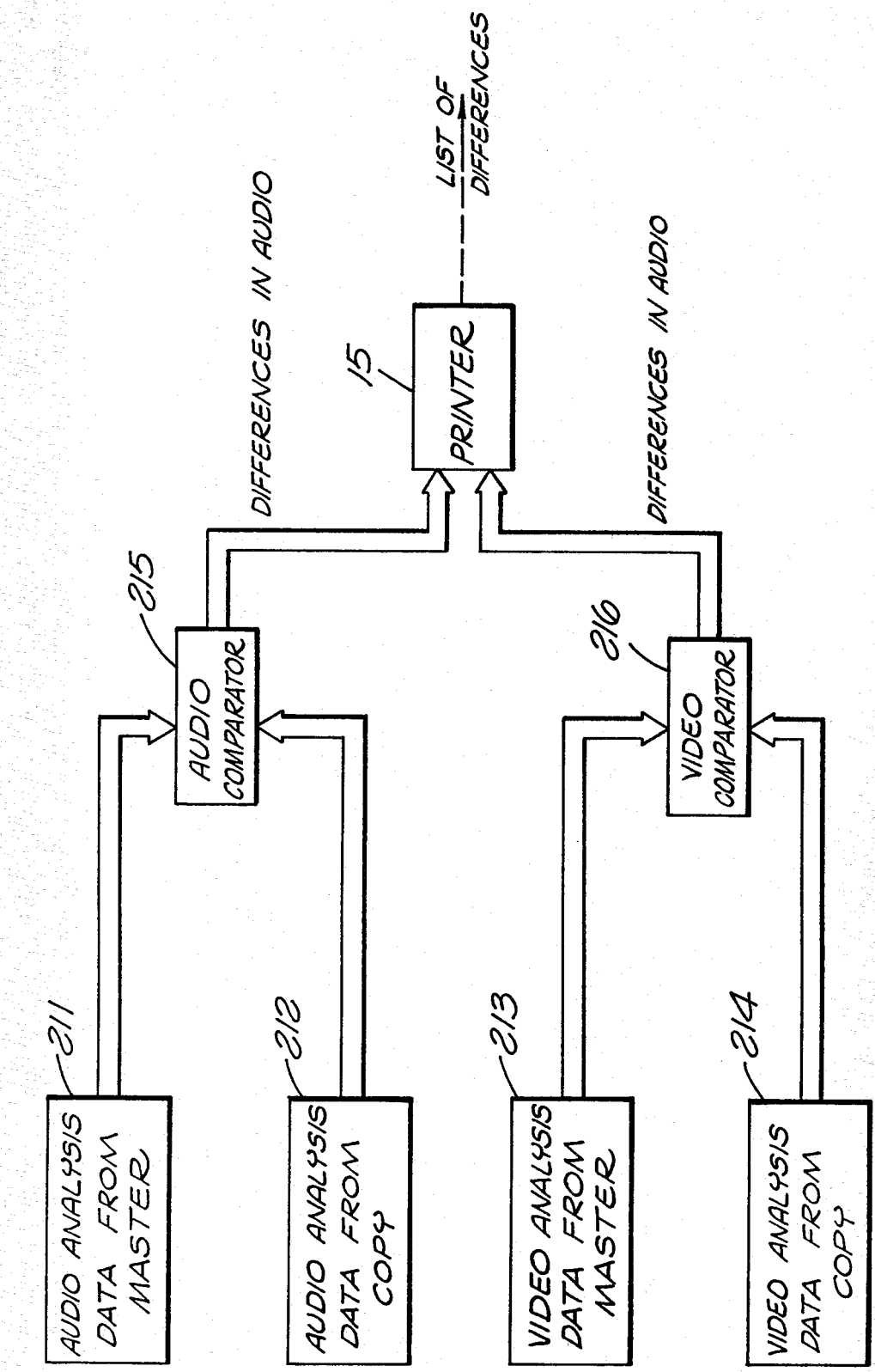
FIG. 23 AUDIO/VIDEO DATA EVALUATION SUBSYSTEM

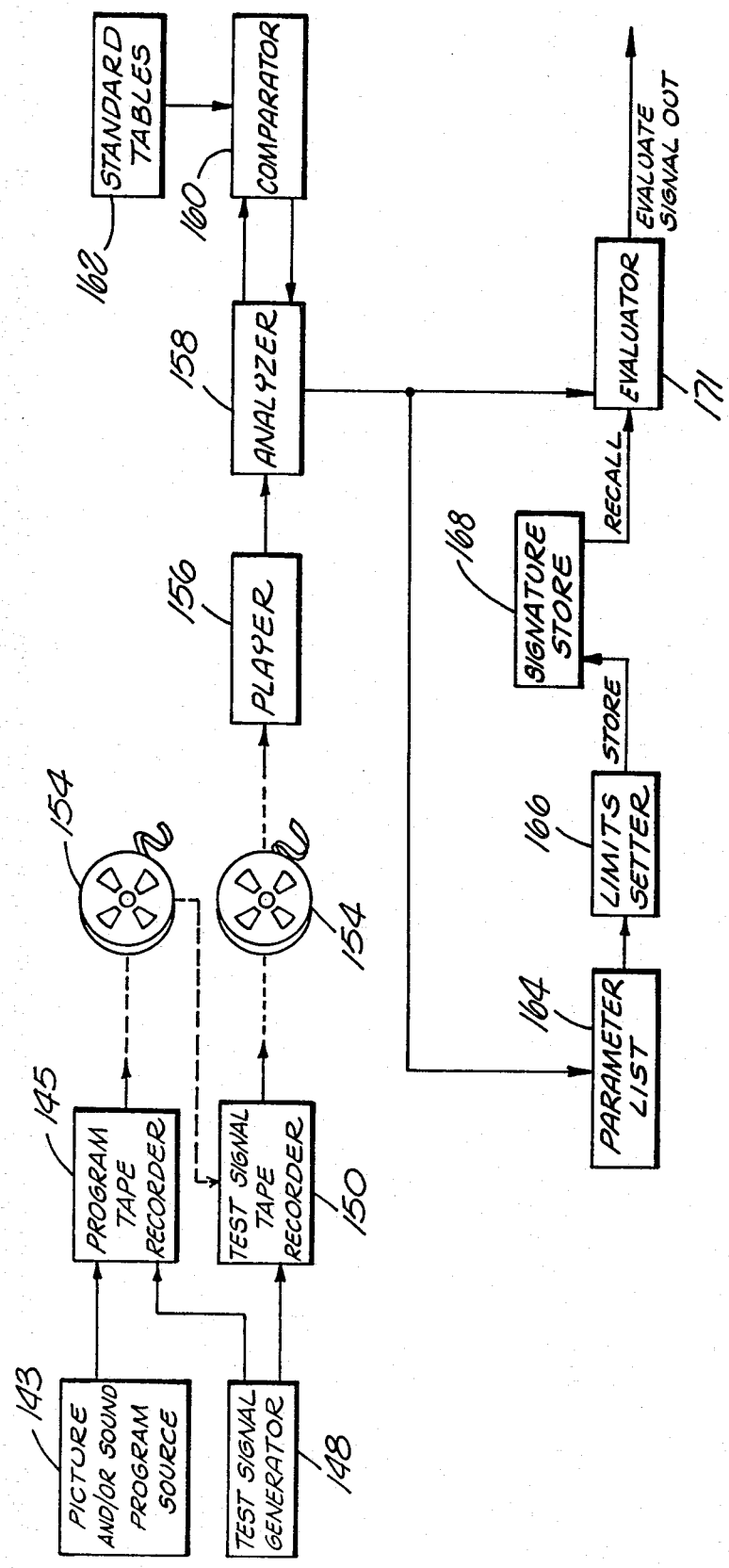
FIG. 24 TAPE EVALUATION

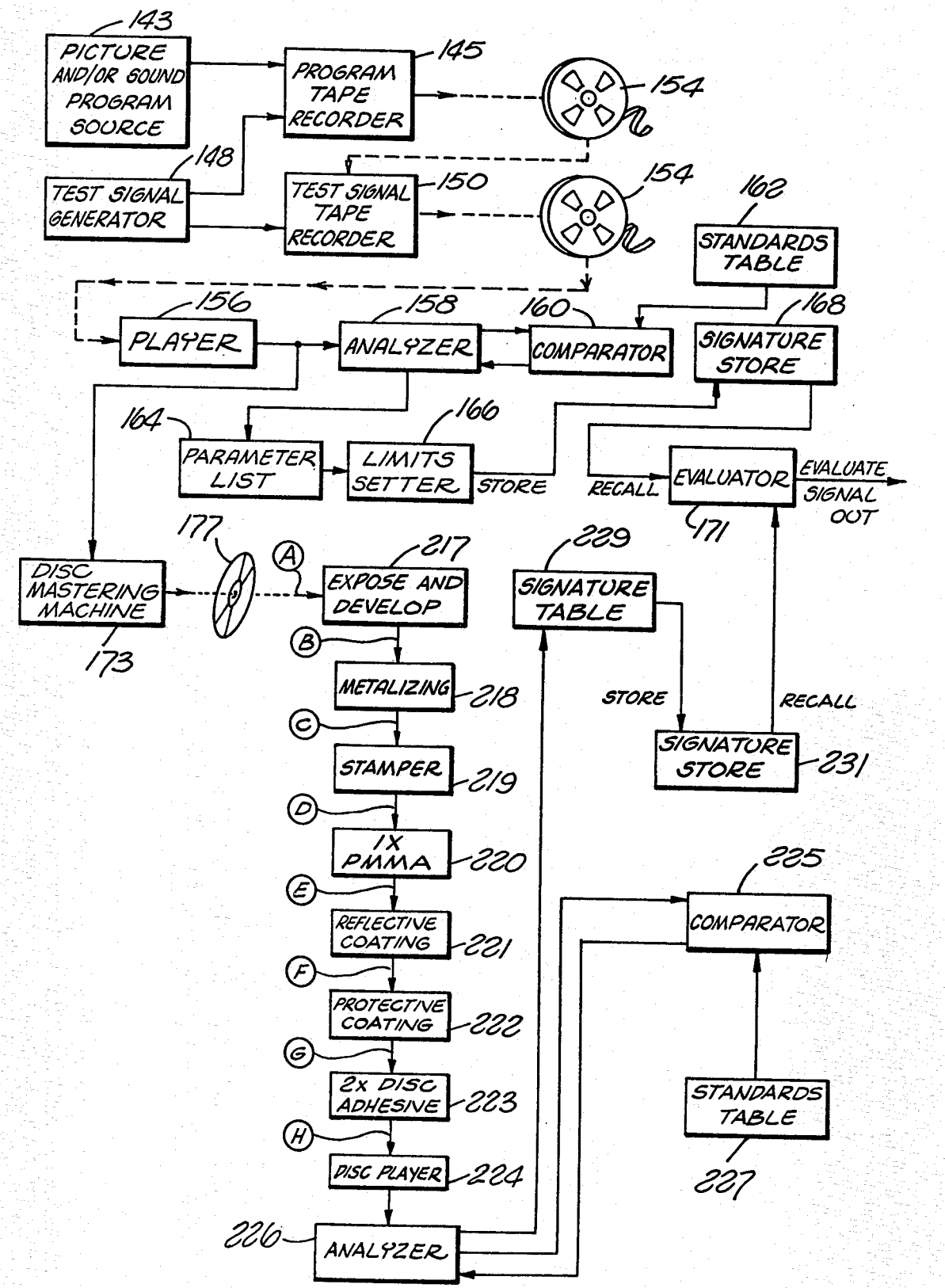
FIG. 25 DISC EVALUATION

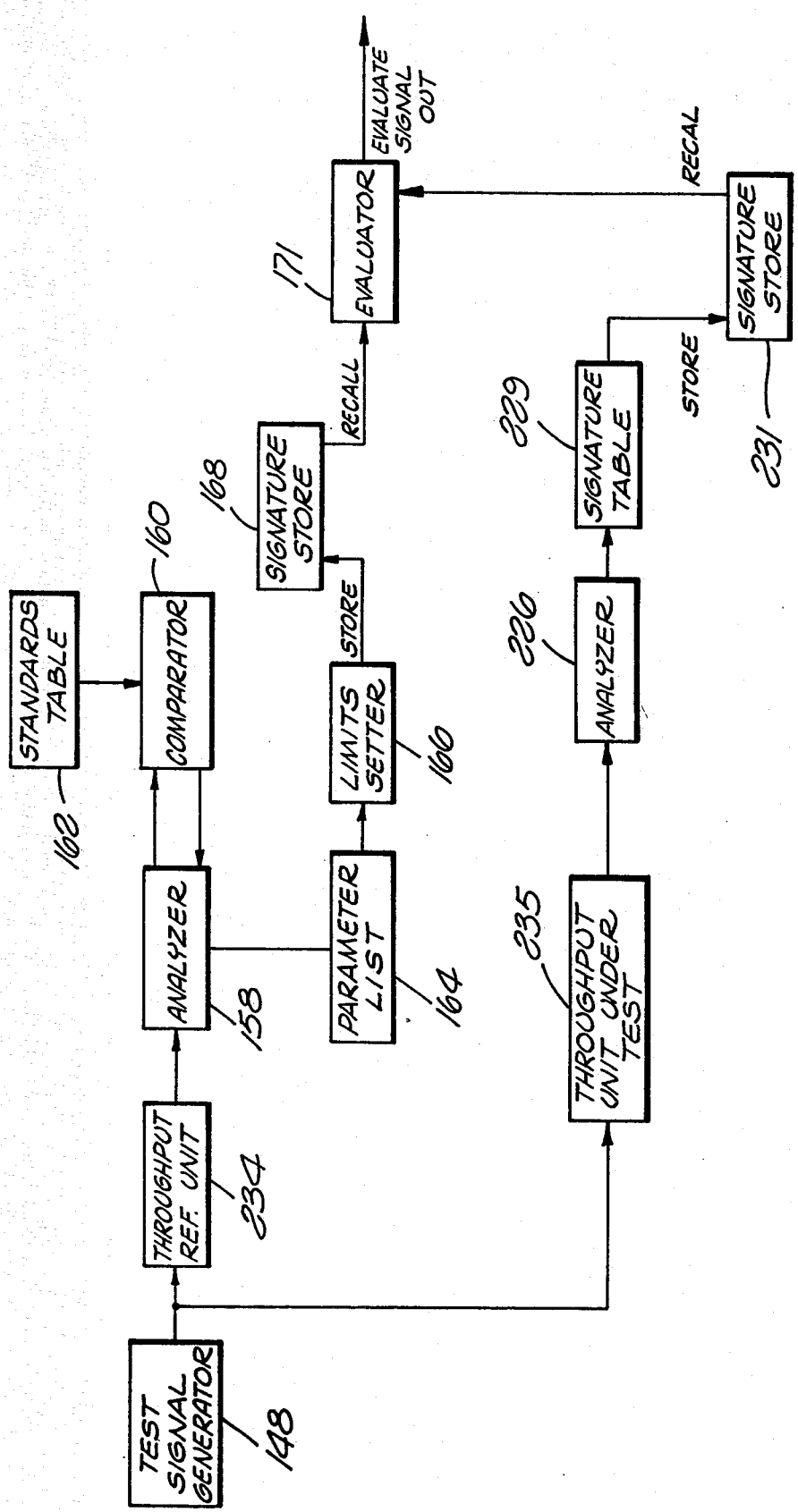
FIG. 26. "THROUGHPUT DEVICE EVALUATION"

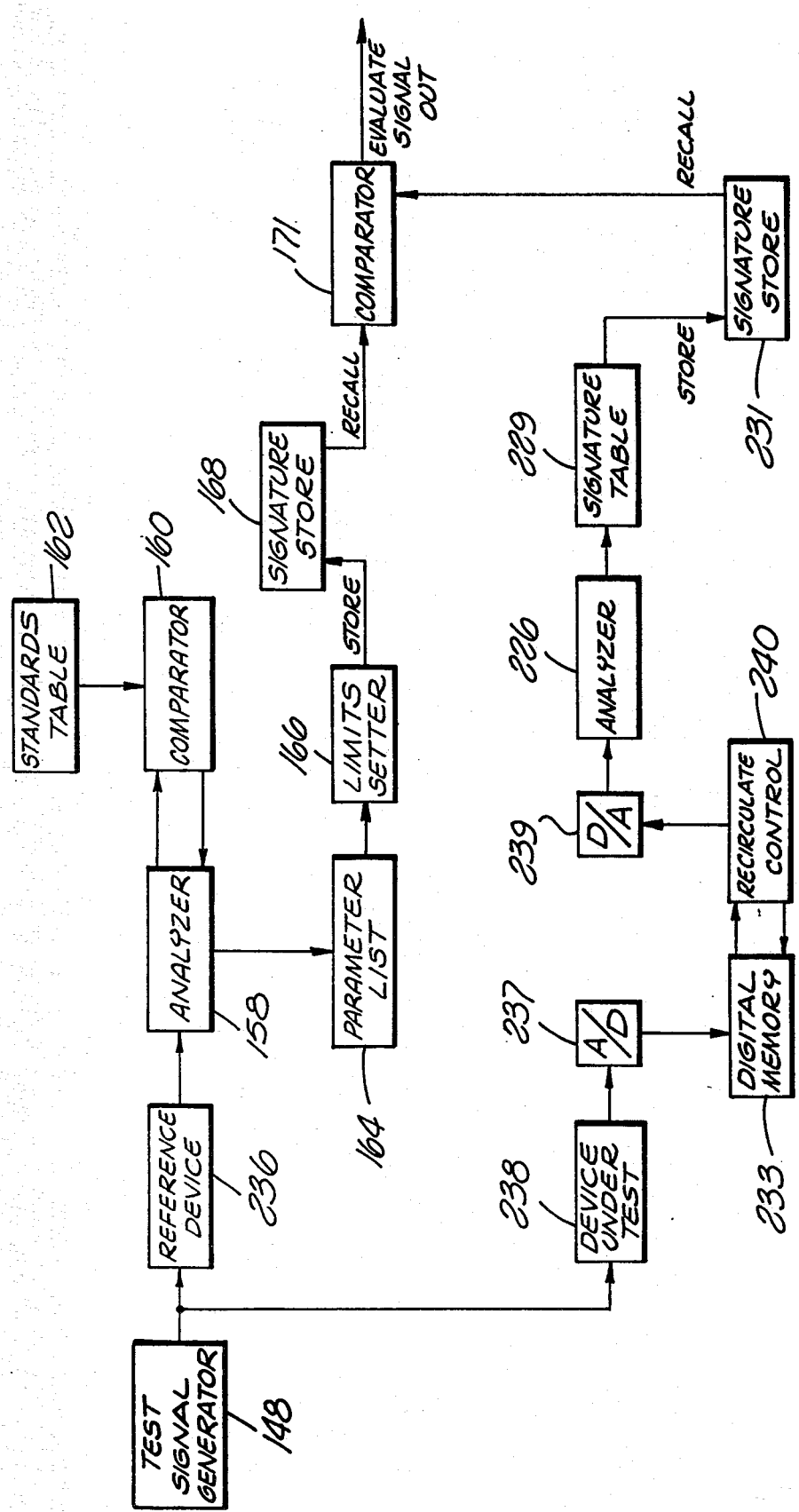
FIG. 27 "DIGITAL SIGNATURE EVALUATION"

AUDIO/VIDEO QUALITY MONITORING SYSTEM

This application is a division of application Ser. No. 339,011, filed Jan. 12, 1982.

FIELD OF THE INVENTION

This invention relates to the evaluation of the quality of audio and/or video transfer characteristics of a device upon which, or through which, audio and/or video information is contained, or passes, respectively. Thus, the invention concerns both method and apparatus for evaluating the quality of information transfer in the recording and playing back of a recording medium or in the transferring of audio and/or video information through an information handling device referred to herein as a "throughput" device. Accordingly, this invention can be effective in the evaluation of a recording medium per se, of the quality of transfer of information contained on one recording medium to a similar or another recording medium, or of a throughput electronic apparatus such as an amplifier or other signal processing apparatus through which audio and/or video information passes.

DESCRIPTION OF THE PRIOR ART

The art of performing a variety of audio and/or video tests on various electronic information handling devices is well known. It is an additionally well-known technique to perform certain audio and/or video tests upon virgin recording mediums such as magnetic tape in order to evaluate the characteristics of the tapes for purposes of quality assurance and for grading, i.e. for categorizing the quality as to grade of the tapes exiting a production line.

Generally, such testing is done by employing manual testing techniques or semiautomatic testing equipment. It is not uncommon, for example, in a magnetic tape manufacturing plant to periodically pull off of the production line a sample of the product being produced. A technician threads the tape on a rather conventional tape recorder/player and, by manually manipulating buttons and knobs of the test equipment and making the appropriate connections on a patch panel or cable matrix, sets up different tests to be performed. Because of the need for allowing standard test equipment to settle and accounting for human reaction time to gather and record the information indicated on some sort of an indicating device, each test is performed for several seconds, often tens of seconds. As test signals are applied to the tape, various test instruments such as voltmeters, frequency counters, signal analyzers, etc., are employed to measure the characteristics of the applied signals. The tape is then rewound, the patch panel or cable matrix is set up differently for inputting to the test equipment the information derived from the recorded tape on playback, and the measurements are made again, this time of the recovered recorded signals. Test results are either manually written down, used as a basis for the a go-no-go evaluation by the technician, or printed out on a high-speed line printer for later evaluation. In any case, not only do the tests require several minutes of a test technician's time, but the test results may not be known until after additional delays are encountered in the analysis of test measurement print out.

Generally, complete testing of one parameter is made before setting up the equipment to test another parameter. For example, an oscillator may be used to apply a constant test tone to a tape for purposes of measuring phase amplitude, signal-to-noise characteristics, and harmonic distortion, and a standard voltmeter or frequency sensitive voltmeter is used as a measuring instrument. To perform the further test of frequency response, a sweep generator is substituted for the oscillator, and a spectrum analyzer is substituted for the voltmeter. Thus, considerable time is needed to make the change of connections for each different kind of measurement.

Furthermore, tests are often performed and evaluated against vaguely defined standards. For some characteristics of a recording medium, especially involving prerecorded video tapes and video discs, the preferred form of testing is by way of subjective listening or observing by unskilled persons who listen to speakers or look at television monitors in an attempt to detect certain defects which perhaps instruments could not detect, which would require an impractical number of tests or instruments, or which would require an impractical length of measurement time to perform. Obviously, this type of testing can result in passing a run of prerecorded magnetic tape or a batch of prerecorded video discs containing defects due to the lack of complete attention by the unskilled human monitors who, understandably, cannot be expected to give 100% attention to the quality of the material they are hearing and/or seeing.

Furthermore, as implied by the above-described methods of testing, manual testing or even semiautomatic testing is extremely time consuming and expensive when each type of test requires its own dedicated test equipment, and the problem is even more extreme when more than one location on the magnetic tape or disc is to be evaluated.

While semiautomatic devices are known for measuring and comparing input versus output information, even with such equipment, it is often necessary to test only one isolated location on a tape or disc, and sequencing of testing for different parameters were, in the past, very slow or manually performed.

While the above described exemplifies the sample testing of blank magnetic recording tape and the post-recording evaluation of prerecorded tapes and discs, the same kinds of problems, expenses, and time delays are encountered in the testing of virtually all other recording mediums such as magnetic, laser, and grooved discs. In the case of phonograph records and grooved video discs, even further delays are expected due to the (from a testing viewpoint) inordinate length of time between the pressing of the record or disc and the testing of same.

Furthermore, the tests referred to above for sample testing of blank tapes in a production run are performed for purposes of evaluating the magnetic characteristics of the medium only and are performed under ideal recording and playback conditions resulting in specifications for the medium per se. In other words, in the production of audio magnetic tape, for example, the test results give an indication of the quality of the magnetic material deposited on the plastic backing such that the manufacturer can guarantee specific limits for such things as coercivity, flux density, drop-out characteristics, etc. When the user of the tape records his or her programs, the copy can be evaluated by the methods described above or by listening or viewing, and the user is conforted by the guaranteed specification of a previously tested sample tape taken off the production line. It is important to note here that such testing (of a recording medium per se) done prior to this invention had little to do with characterizing the program transfer characteristics of a recording medium, i.e. the quality of transfer of program material during the recording/playback process. Rather, such testing ultimately resulted in published magnetic properties for the tape so tested. That is, the characteristics of the tape can be guaranteed by specification to the user, but the quality of the information to be stored and subsequently played back on the recording medium could only be gauged by manually monitoring a program played back after recording or by reference to the magentic properties of the recording medium as compared with the magnetic properties of other mediums and the prior experience of the user. A person in the business of tape duplication or disc manufacture could only duplicate, typically to lesser standards, the kind of testing that the tape manufacturer performed at the outset. Thus, a tape duplicator could record on a test tape certain test signals and subsequently measure the results similar to the manner in which the same was accomplished at the tape manufacturing plant. However, this kind of testing is substantially a duplication of effort and is performed by a tape duplicator primarily as an update check on the duplicating equipment and not for the purposes of evaluating the information transfer characteristics of the recording medium in the recording/playback process.

There are no tests performed at a duplicating facility on a previously recorded program since all testing, as indicated above, is performed on a blank test tape sampling, and a user (or customer's) program material is subsequently recorded at a recording studio on a presumably good quality recording medium. Spot checking of the recorded information after duplication of the user's program by listening and observing a monitor screen has in the past been accepted as satisfactory, since such a procedure represents the state of the art and is rather common in the duplication of magnetic tape, in the production of phonograph records, in the production of video discs, and in the production of duplicate film copies, as well as in any combination of tape/film/disc transfers.

Using magnetic tape as an example again, test signals of the type described above are deposited using prior art procedures on a blank tape and at arbitrarily chosen locations. There is no start or stop or length-of-test data inserted on the test tape, and for that matter none is needed. Since testing is performed on a blank tape, there is no need to fear destroying a previously recorded program, and therefore where on the tape such tests are made, or how long on the tape such testing procedures extend, is of little or no consequence. Furthermore, since the testing described above was, in the past, performed on blank tape pulled from a production line, due to the handling of the tape by the technicians, the tape after evaluation was considered to be unsaleable, and the tested units were discarded, resulting in waste.

Since the test procedures noted above are for evaluating the recording medium itself, there were no procedures known for evaluating a medium which had material prerecorded on it and for subsequently comparing the results of such evaluation with the evaluation of a duplicate copy recorded on another storage medium.

Likewise, no procedures were known for depositing (encoding) test signals on the lead-in/lead-out portions of a medium containing prerecorded program material.

As noted above, because the testing procedures of the prior art required a substantial length of time to perform, it would be considered impractical, if not impossible, to use the lead-in and lead-out portions of a prerecorded tape to make certain performance tests. Furthermore, those minimal tests that were performed on the prerecorded tape in the past involved the observance of test signals deposited at the time the master program was recorded to represent the conditions of recording at the time the master tape was made. That is, when the master tape was to be duplicated, reproduced, or set up for cutting a disc, audio tones at the beginning of the tape were used to set level and frequency response characteristics of the playback units so that they would match corresponding characteristics of the recording equipment. Similarly, in the video portion of a video tape program, a color bar pattern is often inserted at the lead-in on a master tape, but this again is used to align the playback equipment to match the recording equipment. For example, the chrominance level, video level, and hue can be adjusted upon playback by observing such a test pattern on a video monitor. Presumably, the same parameters of the program material to follow will then be played out properly. Again, however, the procedures described for depositing and recovering audio and/or video information from the lead-in of a prerecorded master tape were not for the purposes of evaluating the transfer of information in the record/playback process of another generation of program material, but rather to align the equipment at the duplicating facility with the characteristics of the equipment at the recording facility.

Of course, part of the need for adjusting levels at the duplicating facility results from the losses in quality during the recording of the user's program. However, it is important to note that, whether the user's program is audio or video in nature, the user's program on the tape is a result of a mixdown and/or editing activity, and the lead-in audio test tones or video test signals are merely a part of the overall informational content of the tape supplied by the user (customer). Duplicating the material from the user's tape, there follows the procedure of first aligning the audio and/or video duplicating equipment using the test signals in order to match, to the extent possible, the characteristics of the original recording equipment upon which the master was prepared, and secondly transferring the information after the lead-in test signals so that the final duplicate product would be void of the test signals and contain only program information copied from the user's master tape. It would not be wise to transfer the test signals along with the user's program, since the user would then hear or observe the undesirable test signals, and this would be a distraction to him or her. Thus, this is consistent with the use to which the test signals are put, as discussed above, and renders either impractical or undesirable the transferring of the test signals on the user's tape to the duplicate copy or replica.

Evaluating the transfer characteristics of audio and video amplifiers and the like is also common practice in the art of device testing. Such testing is of primary importance in production testing, quality assurance, and component fault testing.

It is common practice, for example, to apply a reference input signal to a piece of electronic apparatus, or component part thereof, and to measure the output of the device to determine if it is within acceptable limits. Such limits can be established by measuring a previously "known good" device or by establishing test limits according to acceptable standards in the art or by calculation through "worst case" analysis. According to U.S. Pat. No. 3,946,212 to Nakao et al., an automatic quality control system is disclosed in which an estimated value to be obtained from an unprocessed work piece, depending upon information obtained from previously processed work pieces, is calculated and is compared with a predetermined control limit. When the estimated value is beyond the control limit, machine adjustment is called for, and an instruction signal is generated to alert the operator.

Automatically comparing like devices is further exemplified in art by U.S. Pat. No. 3,471,779 to A. J. Ley which tests like devices by applying one complete cycle of a test input signal in the form of a periodic poly function of a substantial number of periods, and determining the RMS value of the error between the test input signal and the resulting linearily related output signal from the apparatus under test. In this manner, although the output versus input characteristics of the like devices are not compared directly, an indication of the quality of the unit under test is accomplished by comparing input and output RMS values, and like devices are compared by comparing the output RMS values for each device.

Other illustrations of comparing like units in the prior art can be found by reference to U.S. Pat. No. 3,651,315 to Collins which compares data combinations taken from a unit under test with the data combinations of a "known good unit". According to Collins, such comparison can be made in digital format using a digital pseudo-random generator in combination with a characteristic of the unit under test to product the set of data combinations compared with those of the "known good unit".

Another form of "like device" testing can be found in U.S. Pat. No. 4,271,515 to Axtell, III et al. A reference unit output signal and an output signal of a unit under test are paired and selectively and synchronously compared in response to a common input signal. The comparison is performed by means of subtraction, producing an error signal which is compared against a limit window.

Another kind of unit testing can be found in another series of prior art patents which compare the output of a unit under test with a reference signal, as opposed to a "like device" as discussed above. Examples of reference data comparison techniques are found in U.S. Pat. No. 3,892,955 to Maejima in which output data obtained from a device under test is compared against reference data contained in a program instruction from a program control unit; in U.S. Pat. No. 3,673,397 to Schaefer which tests the output of a circuit under test against the output of a storage device previously stored with a prediction of the expected response of the stimulus to be applied to a corresponding input of the circuit under test; in U.S. Pat. No. 4,055,801 to Pike et al. which teaches the automatic testing of electronic equipment in a similar manner as Schaefer, but under computer contol, the evaluation by the computer being made against programmed standards; in U.S. Pat. No. 4,266,292 to Regan et al. which tests for faults in an analog-to-digital section and a digital-to-analog section of a code converter in a multiplex telecommunications system; and in U.S. Pat. No. 3,916,306 to Patti in which the testing of complex electronic circuitry is accomplished by exercising the inputs of a large scale integration device under test and monitoring the output as compared with expected output from the device under test and initiating a pass/fail manifestation upon the detection of an inappropriate comparison.

Detecting the analog signal degradation in channel bank apparatus is known from U.S. Pat. No. 4,279,032 to Smith in which a plurality of sequences of prescribed test code words are circulated via a loop-around path bridging the receive and transmit path of a channel unit, and a set of values, each corresponding to a type of analog signal degradation, is derived for each recovered word sequence. The derived set of values is averaged over the recorded sequences, and if any average characteristic value is not within an expected tolerance of a corresponding prestored expected average value, a defective channel unit indication is displayed.

Another particular type of reference data comparison can be found by reference to U.S. Pat. No. 3,142,820 to G. S. Daniels. The Daniels testing system continuously monitors the conditions of variables and records the values thereof by the use of scanning means for sequentially scanning a large number of variables in a predetermined order, and an alarm detecting means for detecting alarm conditions by comparing signals from transducers associated with the variables with predetermined pre-set signals representing upper end lower alarm limits of the variables. According to Daniels, the high and low alarm limits, as well as other factors such as gain and rear offset will be changed for the variables individually or en masse and without interrupting the scanning or recording operations being performed.

In U.S. Pat. No. 4,194,113 to Fulks et al., a circuit board under test is compared to a corresponding known-correct response to identify a faulty output of the board under test. Fulks et al. defines the provision of a main memory which stores a signature file containing known-correct signatures for the nodes of a board under test. A signature is generated for each node on the circuit board and is compared to a corresponding known-correct signature for that node as it is probed by the operator to identify a faulty input node.

Finally, in the prior art disclosures concerning reference and "like unit" comparison testing, reference is made to U.S. Pat. No. 4,184,205 to Morrow and to U.S. Pat. No. 2,893,635 to L. G. Gitzendanner, both of which define data acquisition systems which make use of the data obtained from the units under test to create trend analyses.

BRIEF SUMMARY OF THE INVENTION

Accordingly, it is an object of this invention to provide a method of, and means for, analyzing the signal transferring characteristics of a signal processing unit.

A further object of the invention is to perform a large number of audio and video measurements on the unit under test electronically to determine out-of-tolerance conditions of the unit as a basis for passing or rejecting the unit in a production line.

A further object of the invention is to provide a unit evaluation method and means as described above which will eliminate subjectivity and provide consistency in the quality level of device testing.

Yet a further object of the invention is to provide automated product testing of the type described above wherein a large number of measurements are taken during testing and correlated within-process activities in order to develop out-of-tolerance trends, improved product trends, and to alert supervisory personnel of potential problems in the process so that appropriate corrective action can be taken before potential problems produce real ones. When fully implemented throughout the production line, potential problems can be pinpointed, analyzed, and corrected in almost real-time, thereby eliminating or minimizing downtime for the production line and significantly reducing scrap and waste.

According to the invention, "unit evaluation" is accomplished by establishing an input signal of known content, measuring selected parameters of selected parts of the input signal, feeding the input signal to the unit under test, measuring the parameters of parts of the output signal from the unit under test corresponding to the same selected parts of the input signal, and comparing the selected parameters of the input signal with the corresponding parameters of the output signal.

In the following discussion, the term "unit" in the phase "unit evaluation" includes tapes, discs, audio records, electronic storage, various electronic circuits ranging from simple integrated circuits or printed circuit boards to macrosize amplifier or other complex information handling equipment. Accordingly, "unit evaluation" may comprise the analysis of information recovered from a recording medium or information sensed at the output of a "throughput" device, "throughput" being defined as a signal processing unit through which a signal is passed and processed, such as a pre-amplifier, amplifier, circuit board, etc.

Since this invention is exceptionally useful in the evaluation of videodiscs, a special form of the phrase "unit evaluation" will be used throughout this application, and thus, "disc evaluation" will refer to the analysis of information retrieved from a videodisc as compared with the analysis of the recording medium (generally tape) of which the information recorded on the disc is duplicative. Thus, "tape evaluation" will refer to evaluating the contents of a master tape, while "disc evaluation" will refer to the information retrieved from a replicated disc.

Another term used throughout this application is "signature". The term "signature" has been used in the prior art to designate a parameter listing against which devices being tested are compared. Examples of the use of the term "signature" can be found in U.S. Pat. No. 4,216,374 to Lam et al., and U.S. Pat. No. 4,194,113 to Fulks, et al. In both prior art disclosures, however, the term "signature" refers to a specific and exactly predictable electronic state to be used as a test reference. In the Lam et al. patent, the "signature" is a particular bit pattern, and the unit under test when exercised in a specific manner must exhibit the same bit pattern in order to be considered an acceptable unit. In the Fulks, et al. patent, the nodes are probed, and the signals at each node are verified to be accurate as compared with a "signature" by counting the number of logic level transitions of the node under test or computing cyclic redundancy check characters. In the manner in which "signature" is used in the prior art, there is no identification of a characteristic or personality of the unit under test as there would be in the traditional use of the term "signature". All that is required in the prior art is that certain transitions occur at the proper time for the unit under test, and if for a given input to the unit, a proper response is noted, the unit is said to have conformed to the "signature" of a theoretical model.

In counter-distinction to the use of the term "signature" in the prior art, the term as used in this application does have a degree of identity or "personality" of the unit under test, insofar as the "signature" is comprised of a multiplicity of test parameters, each parameter having limits within which comparable measurements of the unit under test must fall. Accordingly, the "signature" as used with this invention is a practicle, as opposed to theoritical, model against which all further units are compared. Thus, "signature" may account for degradation of a parameter in the recording/playback process of a magnetic tape, a videodisc, or a throughput device.

Accordingly, the pass/reject test for unit evaluation according to the subject application is based upon undue degradation versus acceptable signal fidelity in the analysis signal transfer through the unit. Because a large number of audio and video measurements on the unit are utilized in producing a "signature", exacting ranges for tolerance limits can be established to produce quality units consistent with acceptable yield figures. Furthermore, the "signature" parameters of this invention are derived in analog fashion, and can therefore obtain a value within a range of acceptable limits (as opposed to the mere detection or not of a digital logic level per the prior art), and such a "signature" can therefore account for system losses. For example, in the production of a videodisc, the reference "signature" is derived from measurement of the magnetic tape master from which a disc master is produced. Hereinafter, the tape master from which a video disc master is made will be referred to as a pre-mastering tape. Furthermore, a particular "signature" can be established for each process step in the making of the final videodisc, inclusive of transfering a customer's tape to a pre-mastering tape, exposing and developing a master disc, metalizing the master disc, producing a stamper from the master disc, producing a single disc half from the stamper, depositing a reflective coating on the disc half, adding a protective coating to the disc half, adhering two disc halves together, and final test after labeling and before packaging. In each of the steps, a different signature can be established, with each subsequent down-stream signature having different, usually wider, tolerance limits than the previous one. In the injection molding of the disc half, for example, there are expected losses due to birefringerence, planing, contamination, etc. By studying the degradation of the "signature" as the product is produced, attention can be given those areas in the process which contribute most greatly to the degradation of the product.

In addition to substantially "real-time" evaluation for correlation with "in-process" activities to provide alarm or reporting techniques to alert personnel in case of out-of-tolerance conditions, the out-of tolerance parameter trends can be utilized to improve specific manufacturing processes or process steps due to the highly accurate, repetitive, objective testing capabilities of the invention. Such "trend" information can be utilized to foresee potential problems even though the parameters tested at any given time is within exceptable limits. For example, continuing wear or gradually soiling parts can be detected by observing an unusual change in the "signature" parameters.

Additionally, the use of a "signature" in the manner used with this invention can become a valuable research and development tool. For example, on a pilot line incorporating the monitoring system according to this invention, certain process parameters can be changed e.g. temperature, pressure, time, etc., in order to observe how the "signature" is effected by each process parameter change.

Moreover, because of the automatic and high speed of testing which will become evident in the further discussion of this invention, many units under test can be simultaneously evaluated by a single operator. A single central controller can interrogate, through a plurality of interface subsystems, a similar plurality of audio/video test subsystems with complete accuracy and repeatability of parameter testing. The central controller is then adapted to retain the test results in its memory until recalled to be processed in a data evaluation subsystem and made into a permanent record in a data readout device. This is in bright contrast to the rather crude manual procedures in the past where a single operator subjectively observes and listens to three or four programs simultaneously and makes on-the-spot evaluations with permanent records being solely in the form of simple notes or boxes checked on a form. Since evaluation of units by a different operator will involve a totally different subjective evaluation, it is clear that comprehensive and accurate trend analysis is not possible. Furthermore, inconsistency in the evaluation of the final product is unpredictable even for the same operator on different days of employment.

Basically, the invention comprises a central controller with its peripheral memory, keyboard, and readout devices, an audio test subsystem, a video test sybsystem, and a data evaluation subsystem. The unit under test in the examples of the following discussion will concern the evaluation of a video disc, the informational content of which was taken from a video tape. It will be understood that, in view of the large number of possibilities for application of the invention, the description will be simplified by referring primarily to the field of producing and testing video discs, although the application to other types of recording mediums and throughput devices will be evident as description details are given.

The central controller for the monitoring system of this invention can be any one of a family of known small, high speed, computers that provide an array of peripheral equipment including disc storage devices, printers, display stations, and communications and interfacing capabilities that are necessary for communicating with the audio, video and evaluation subsystems.

The major steps in producing a video disc from a source material include preparing a submaster tape from the customer's master tape while simultaneously depositing audio test signals before, during, and after the program material, analyzing the test signals and program material on the tape, deriving a "signature" of the submaster tape, establishing tolerance limits for the parameter components of the signature, transferring the audio and video information from the submaster tape to a video disc through process steps to be discussed later, playing back the recorded disc and recovering test signals therefrom to produce an output signature of the disc, comparing the output signature of the disc with the signature established from the submaster tape, and evaluating the comparison results and reading out desired data gathered during data evaluation.

Audio test signals are deposited on the lead-in and lead-out portions of the submaster tape, i.e., on those portions of the submastering tape preceding and following the program material, respectively. Upon playback of the submaster tape or the disc, the audio test signals on lead-in and lead-out are analyzed and made part of the respective signatures for the tape and disc.

Additionally, audio and video measurements are made during the active portion of the program material, the audio portion being analyzed for spectrum analysis during a prescribed time period, and a test is made of the audio channels of the recording medium to dertermine whether or not a monophonic or non-monophonic signal is contained in each of the (generally) two channels.

Finally, the video portion of the recovered signals from the recording medium are analyzed using the VITS and VIRS signals deposited in the vertical interval of the signal contained on the submaster tape and subsequent disc program.

In a practical application, the audio test subsystem reads and makes 24 audio measurements and/or tests on both channels of lead-in and lead-out of the pre-mastering tape. These measurements are compared with standards, and if acceptable become part of a "signature" for the particular tape. In addition, monophonic/non-monophonic testing and audio spectrums are obtained at intervals throughout the active program area and the data so obtained also becomes a part of the signature. A number of samplings of video measurements are taken throughout the active program area as indicated previously and/or tests, and each video sampling provides 45 measurements that are compared with standards, and if acceptable also become a part of the tapes "signature". The audio and video measurements procedure just described is termed "tape evaluation", and produces a printed report and a "signature" that may be retained for future use or transfered to another monitoring system via diskette or teleprocessing.

The monitoring system of this invention also provides the capability of performing the identical set of measurements on products subsequently produced from evaluated tapes, e.g. other video tape copies or disc copies. The measurements, both audio and video, comprise an output "signature" which is compared with the evaluated tape's "signature", and exceptions are noted when any comparison exceeds tolerance limits. This latter procedure is termed "disc evaluation".

The invention will be described in detail having reference to the appended drawings in which:

FIG. 5 illustrates a representation of a length of video tape showing the position of lead-in, lead-out program material, and track locations for audio and control and cue tracks;

FIG. 6 shows in the upper half thereof, a special representation of the placement of audio test tones at the lead-in and lead-out portion of a video tape or video disc, and in the bottom half thereof, a pictorial representation of the signals in the corresponding blocks of the top half of the figure;

FIG. 7 shows in block diagram form, the audio test tone generator logic for creating the audio test tones for placement on lead-in and lead-out of the video tape or video disc;

FIG. 8 is a timing diagram showing the audio test tone generation according to the test tone generation logic of FIG. 7;

FIG. 9 is a general block diagram illustration of the audio analysis logic portion of the audio test subsystem;

Figure 12:
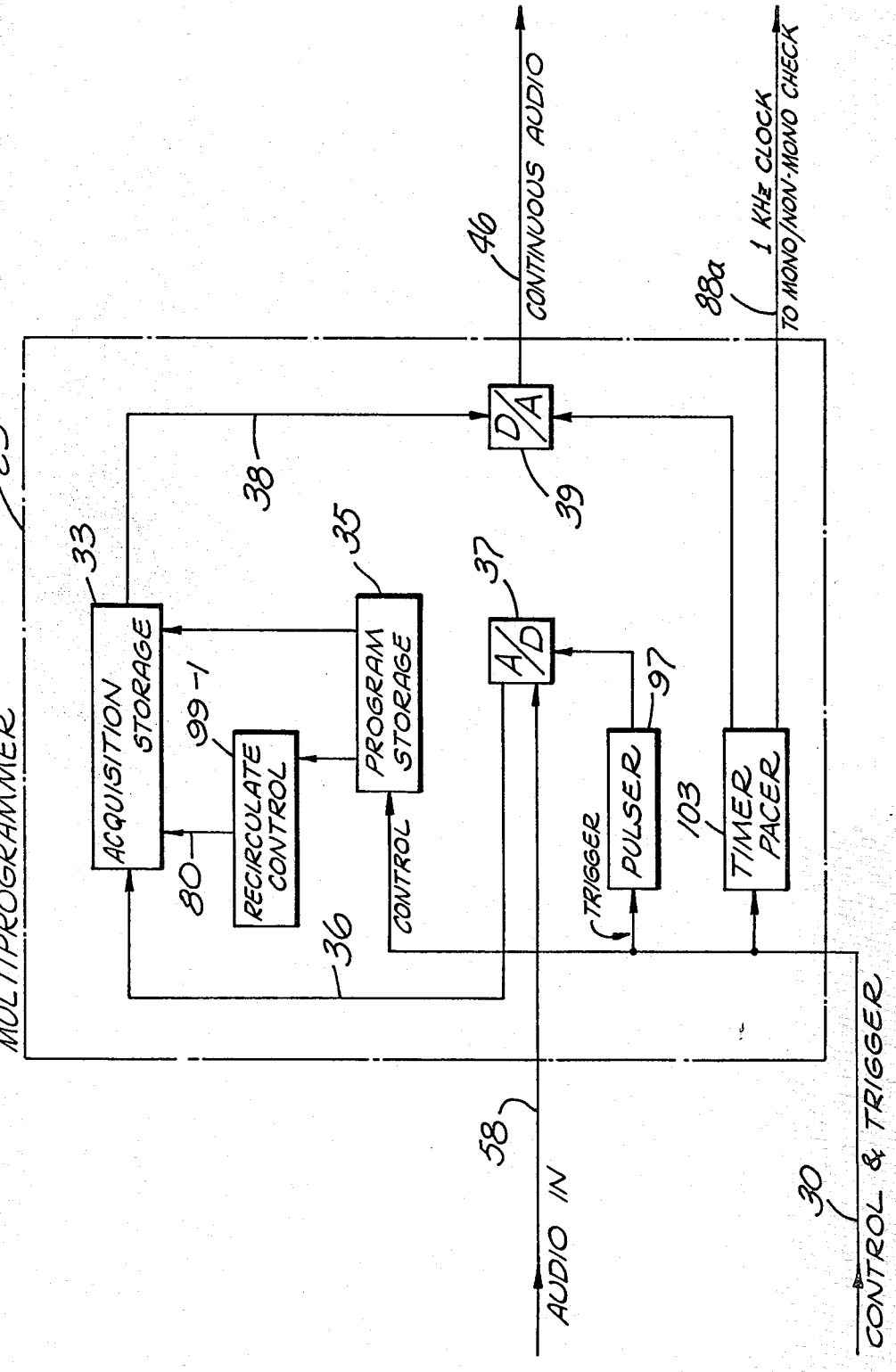
Figure 13:
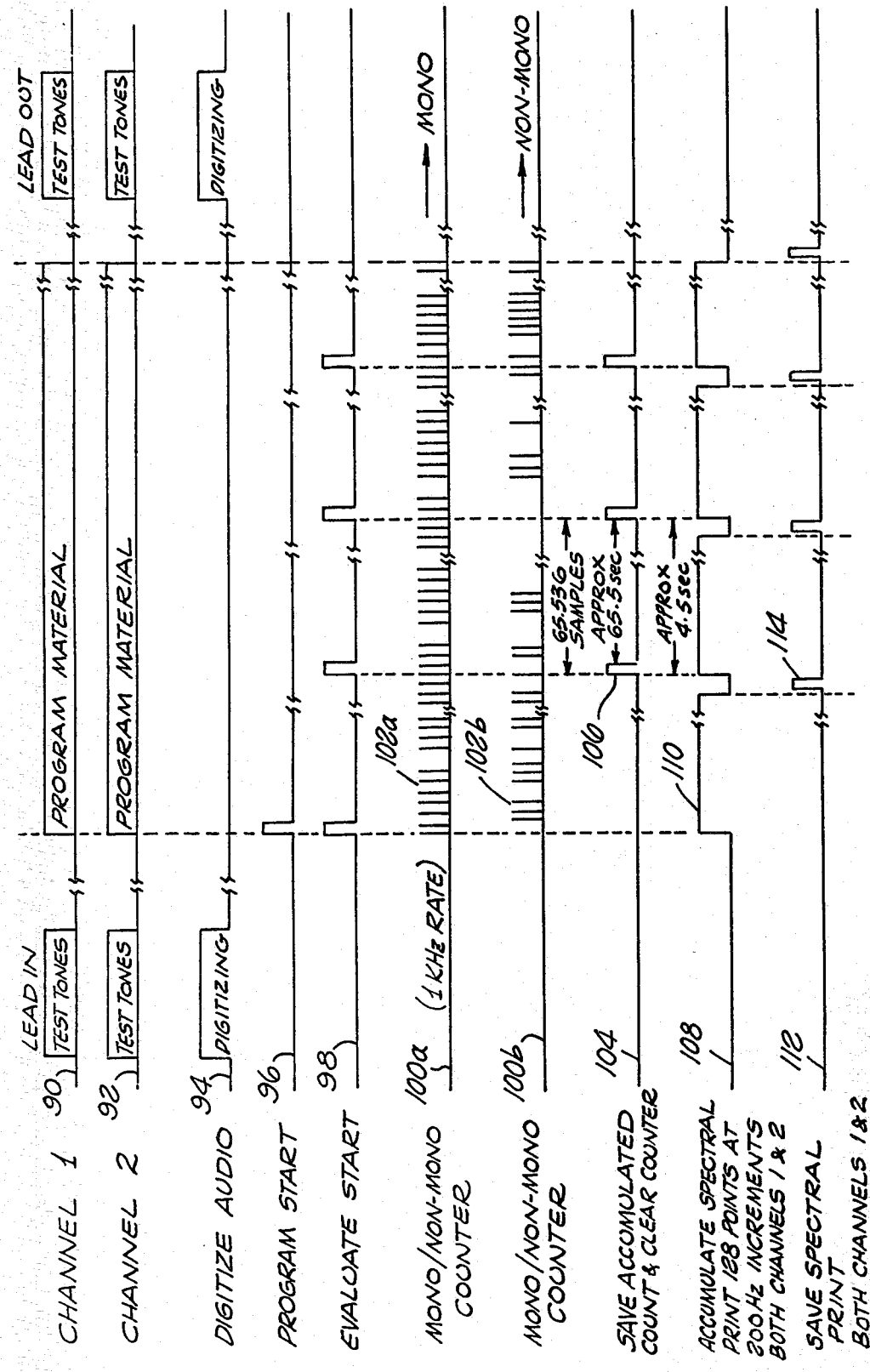
Figure 14:
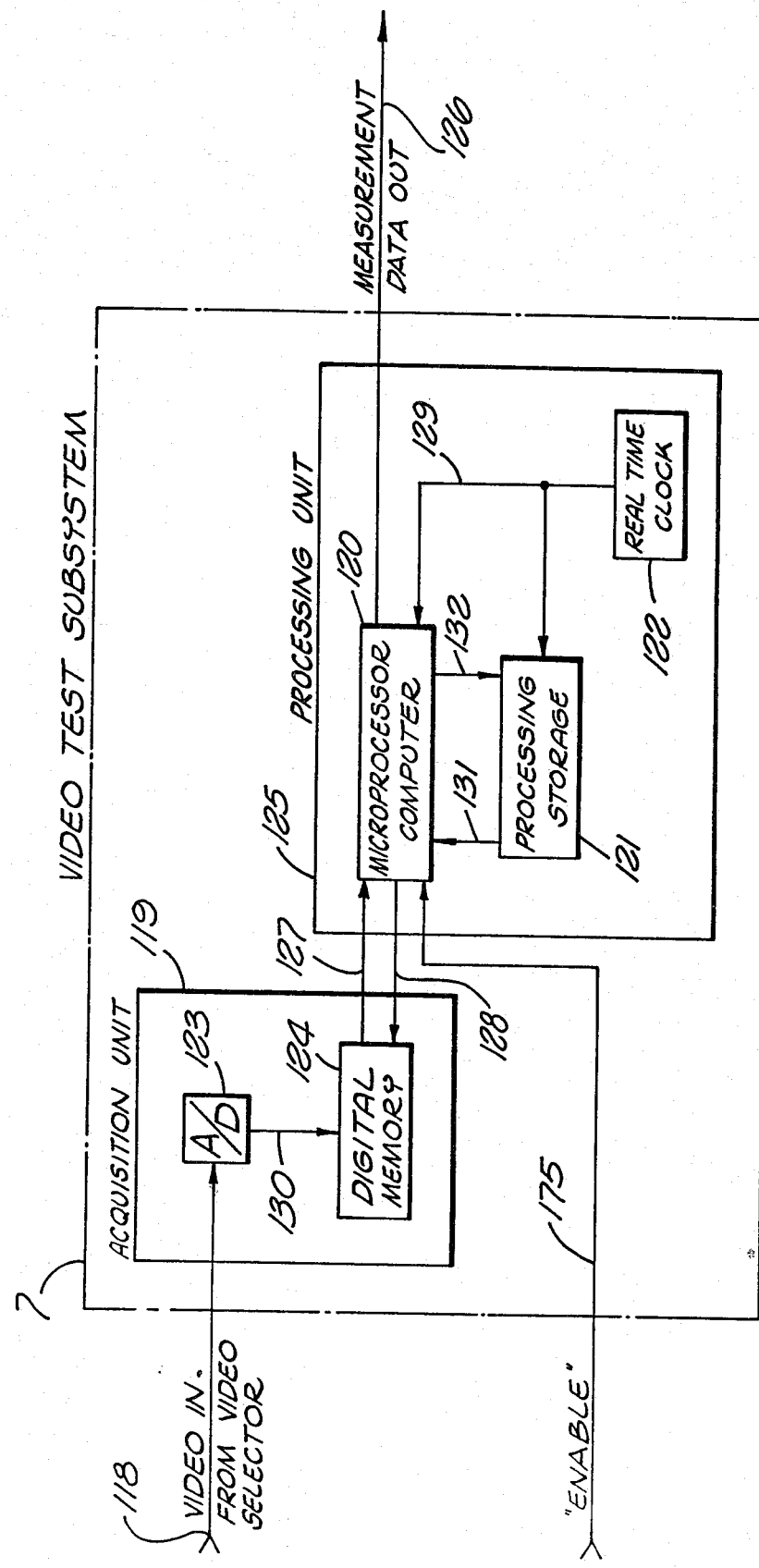
Figure 15:
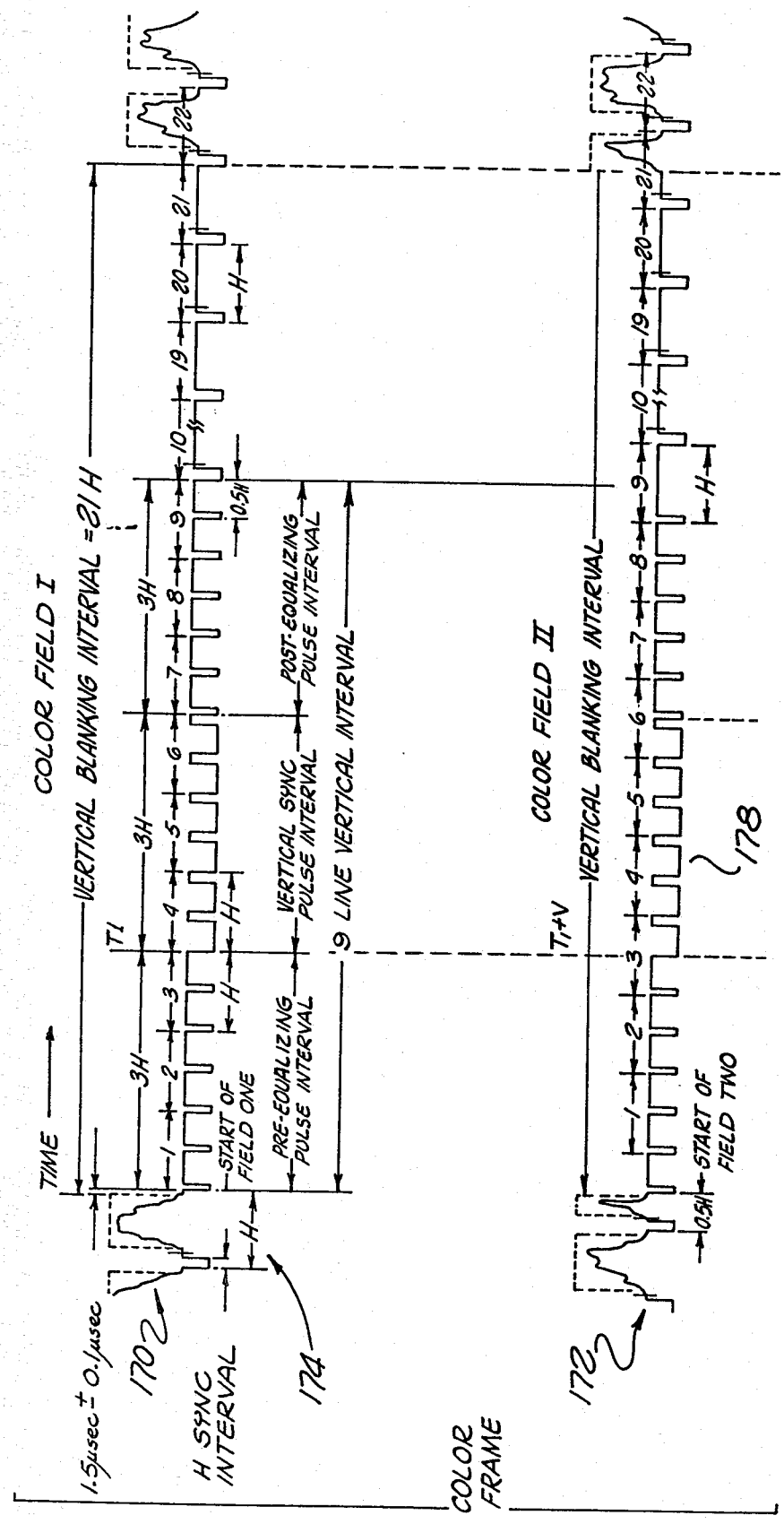
Figure 16:
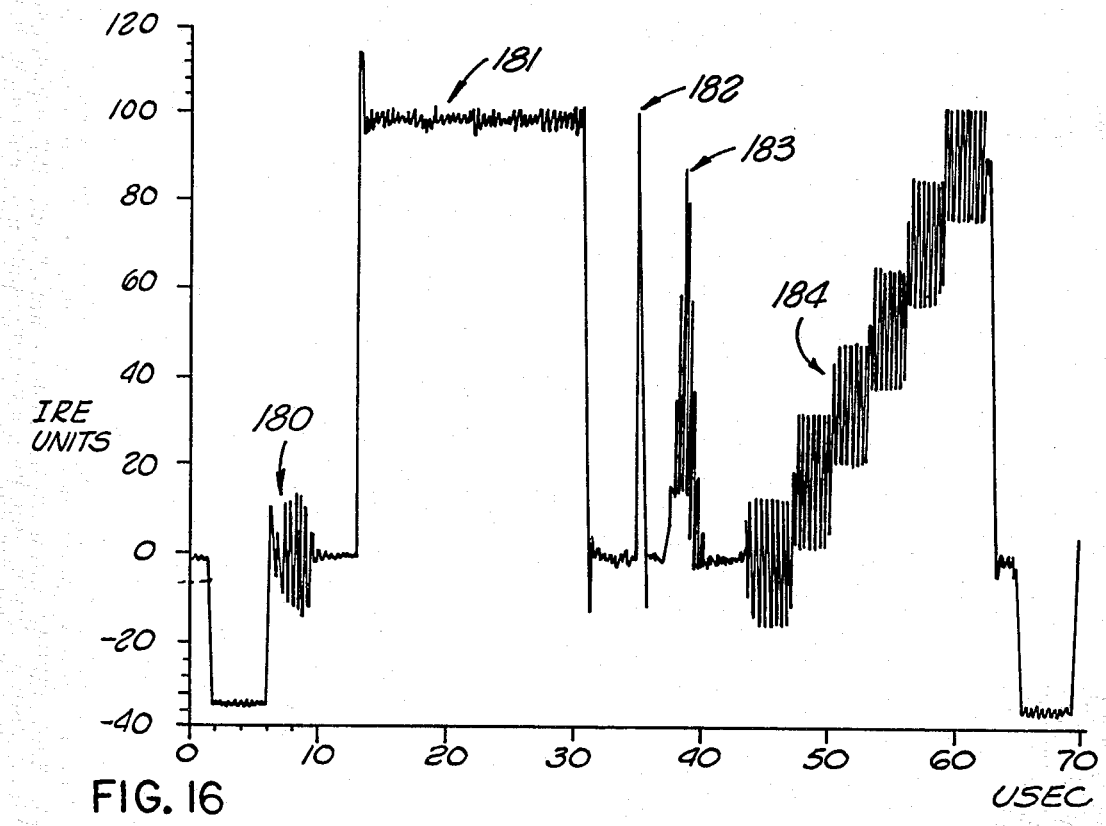
Figure 17:
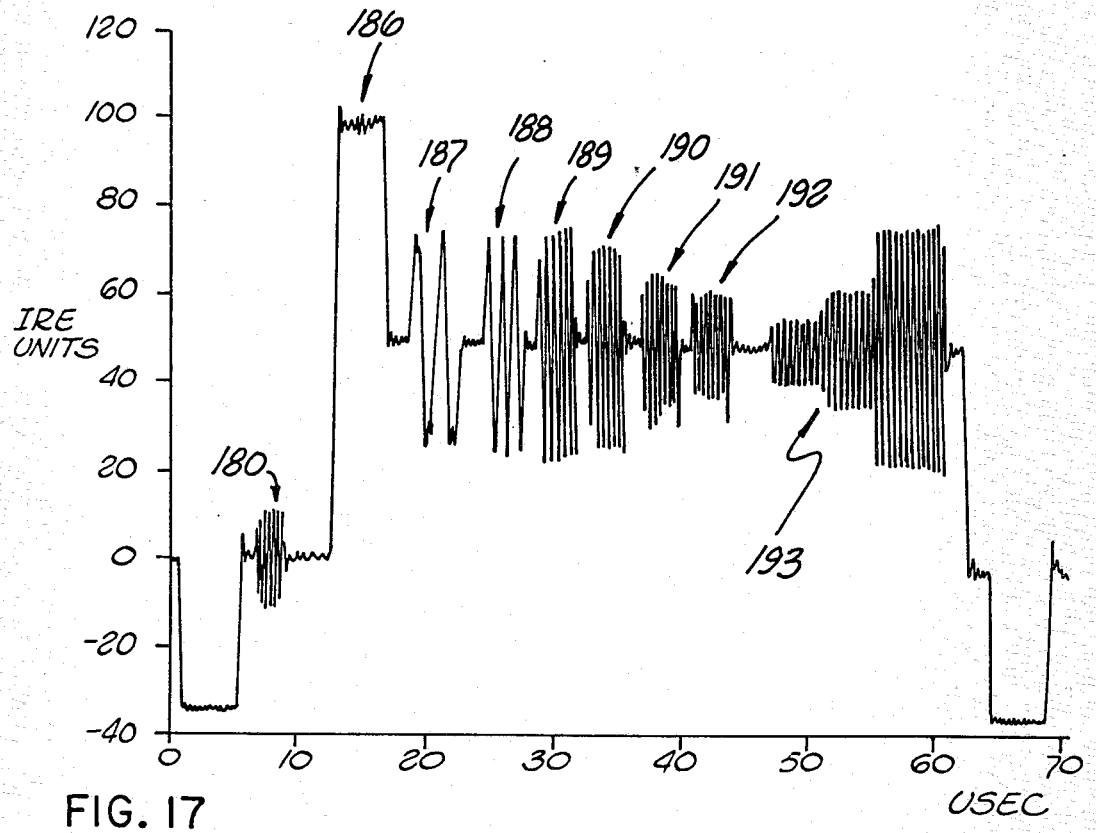
Figure 18:
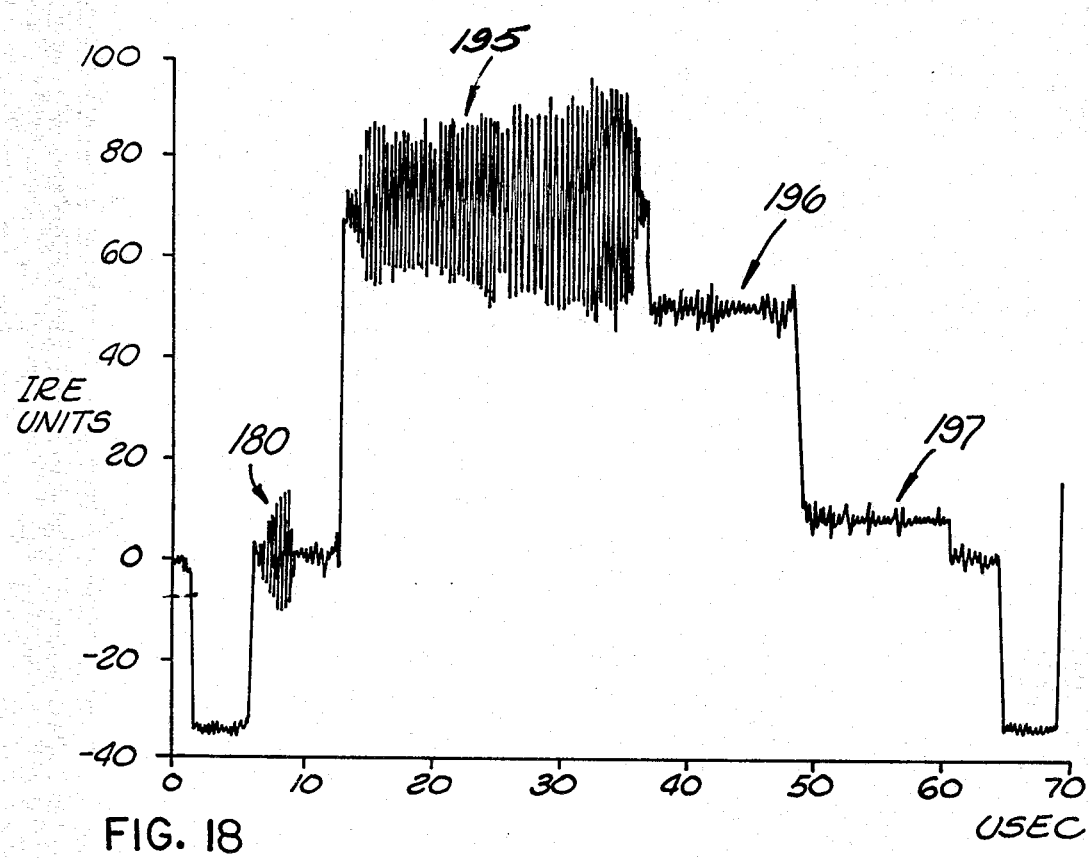
Figure 19:
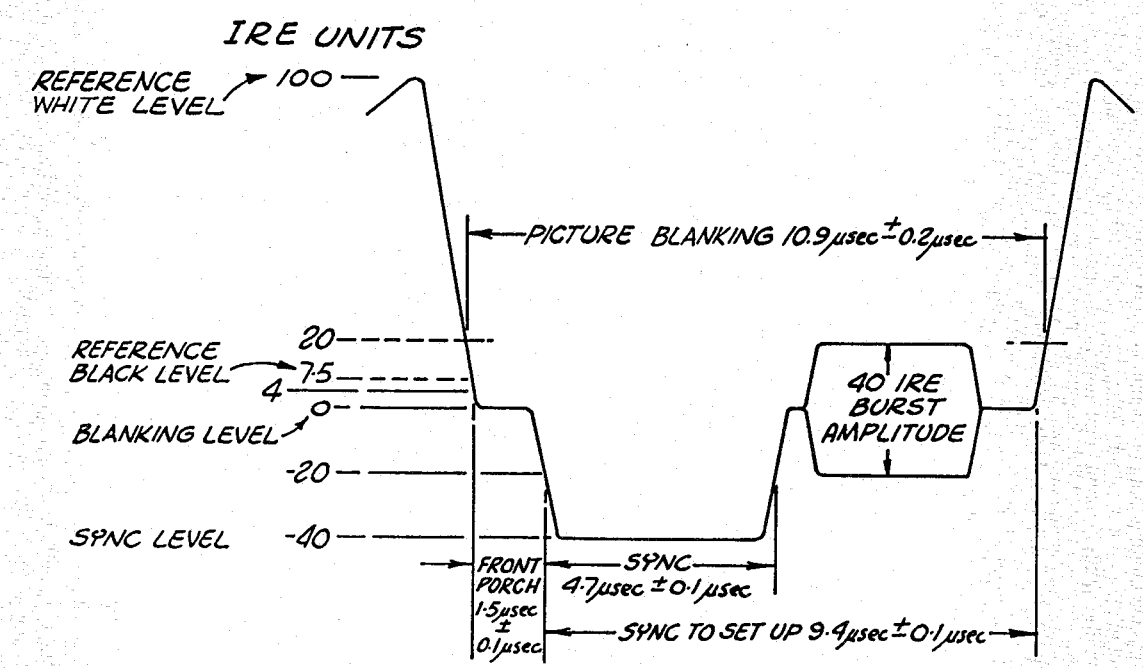
Figure 20:
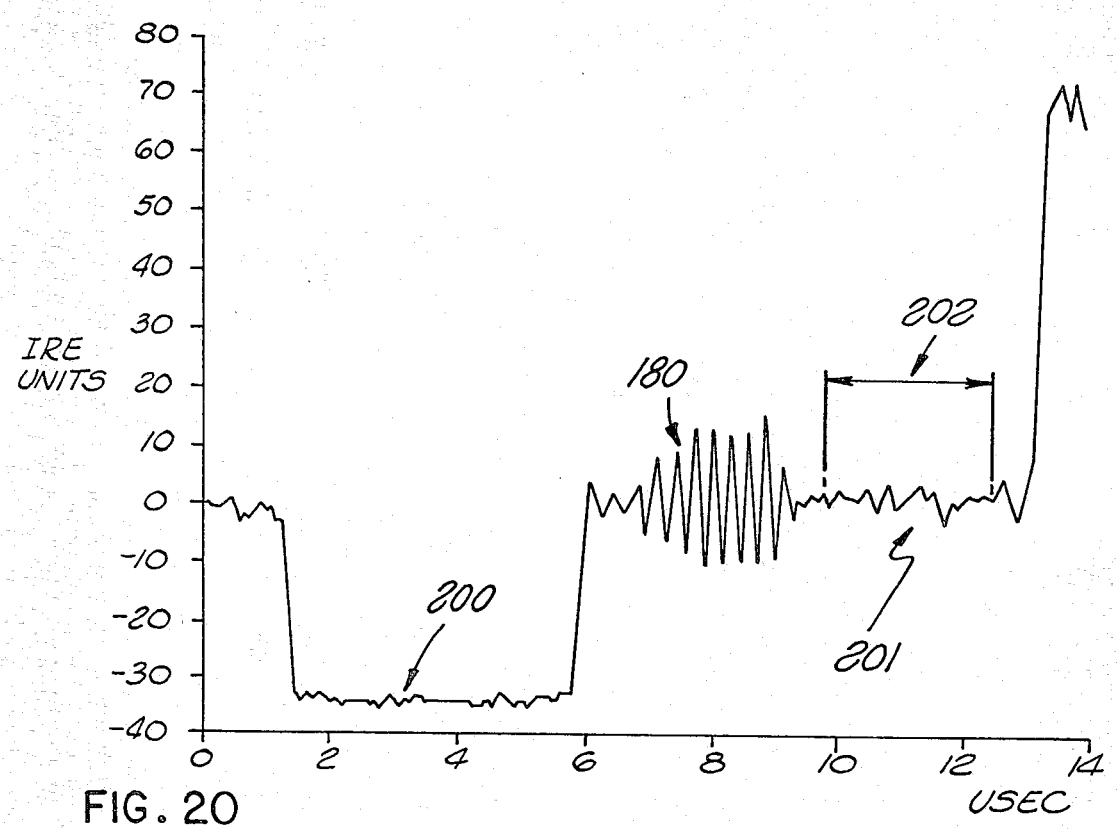
Figure 21:
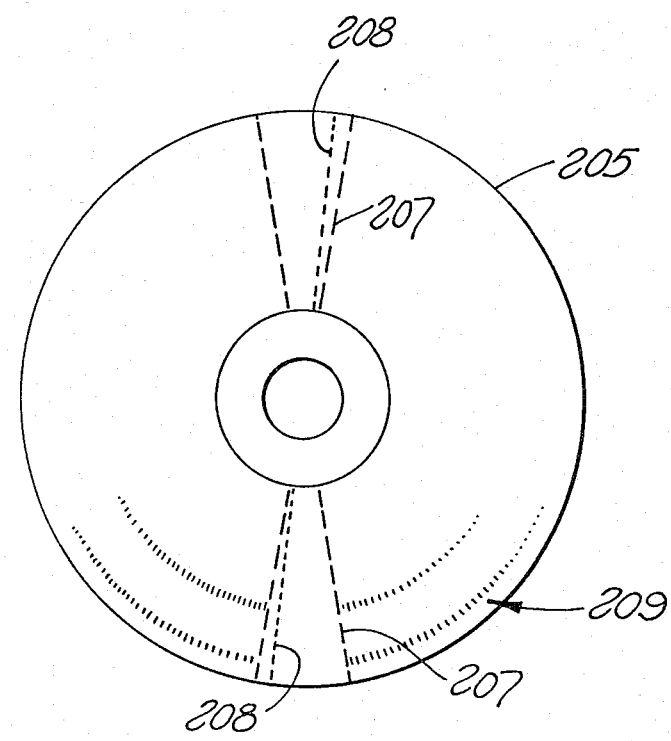
Figure 21B:
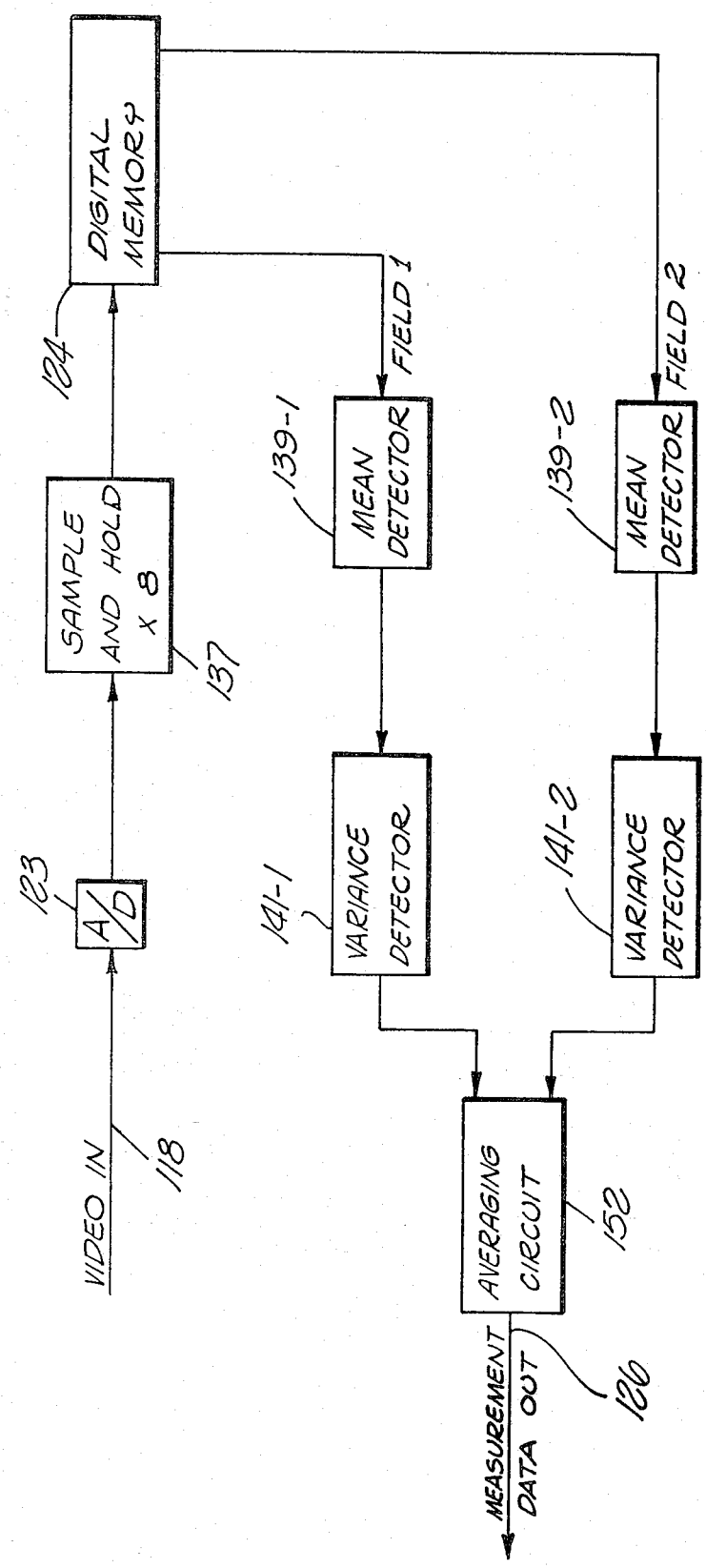

FIG. 12 snows the details of the multi-programmer portion of the audio analysis logic of FIG. 9;

FIG. 13 is a timing chart showing the relationship between the signals operative for carrying out the audio analysis according to the logic diagram of FIG. 9;

FIG. 14 illustrates, in block diagram form, the operative functional blocks of the video test subsystem;

FIG. 15 shows a standard television wave form for two color fields representing a single color frame according to NTSC standards;

FIG. 16 shows the waveform of the Composite VITS signal located in the vertical interval of the video portion of the active program material;

FIG. 17 shows the waveform of a Combination VITS signal located in the vertical interval of the video portion of the program material;

FIG. 18 shows the waveform of the VIRS signal also located in the vertical interval of the video portion of the program material;

FIG. 19 shows the waveform and specifications for a standard horizontal blanking pulse with corresponding synch pulse and color burst signal;

FIG. 20 is a waveform showing the theoretical waveform of FIG. 19 as it would appear on an oscillascope, and showing, more particularly, a flattened portion of the waveform on the back porch of the horizontal blanking pulse immediately following the color burst signal;

FIG. 21 is a pictorial representation of the distribution of points on a video disc on which noise characteristics are measured;

FIG. 21B shows, in block diagram form, the circuitry useful in measuring the noise content on the back porch of the horizontal blanking pulse of FIG. 20;

FIG. 22 is a general block diagram showing the video analysis logic associated with the video test subsystem;

FIG. 23 is a general block diagram of the audio/video evaluation subsystem;

FIG. 24 is an overall procedural block diagram showing the manner in which tape evaluation is accomplished according to the present invention;

FIG. 25 is an overall procedural block diagram showing the manner in which the disc evaluation is accomplished according to the present invention;

FIG. 26 is an overall procedural block diagram showing the manner in which the throughput device evaluation is accomplished according to the present invention; and FIG. 27 is an overall procedural block diagram showing the manner in which the digital signature evaluation is accomplished according to the present invention.

DETAILED DESCRIPTION OF THE INVENTION

Figure 1:
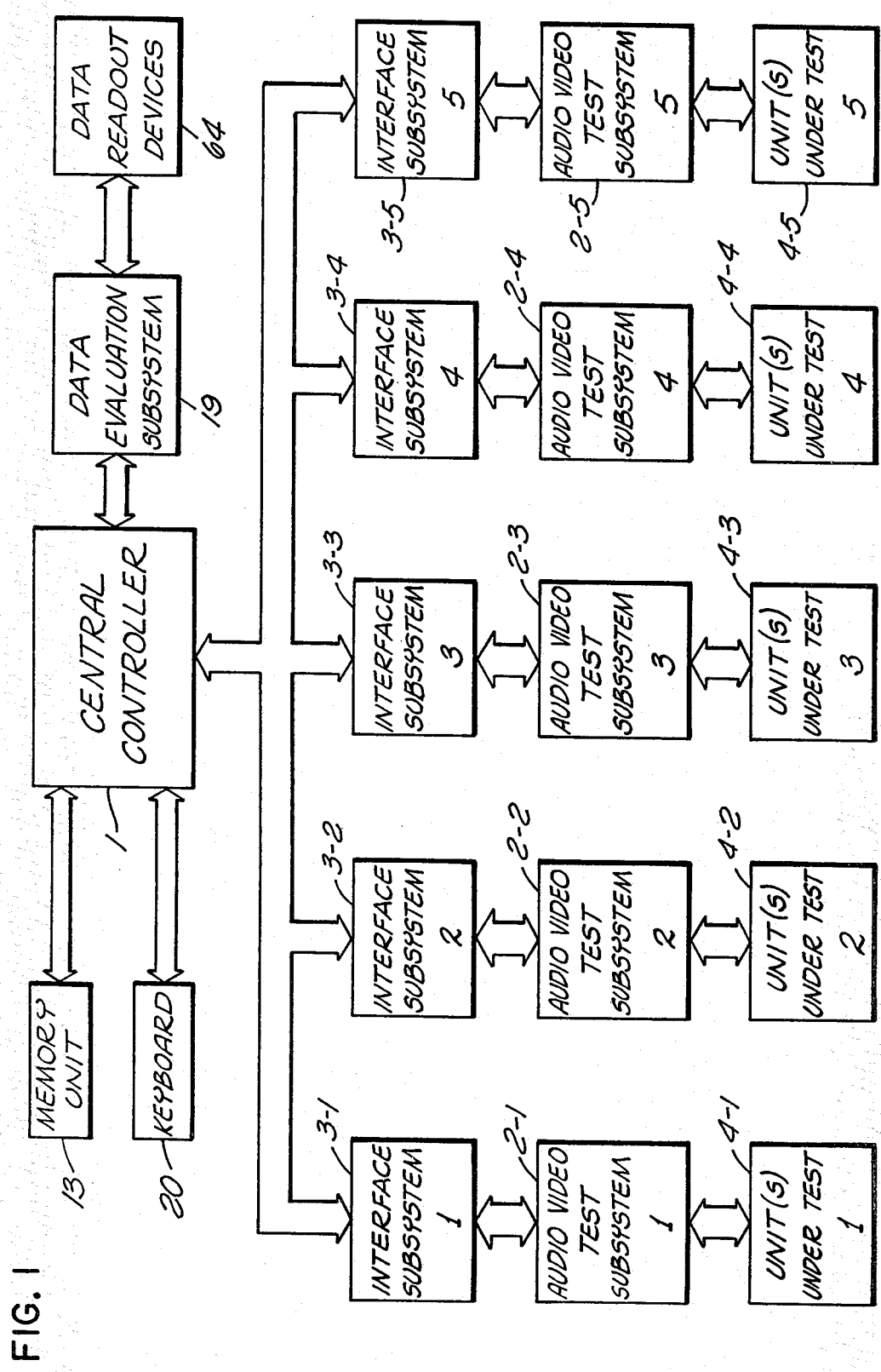
FIG. 1 shows in block diagram form a complete audio/video quality monitoring system in which a common central controller cooperates with multiple interface subsystems and associated multiple audio/video test subsystems.

FIG. 1 shows a complete audio/video quality monitoring system utilizing a central controller 1 and a plurality of terminals each comprising an interface subsystem 3, an audio/video test subsystem 2, and the unit under test 4 connected to the audio/video test subsystem 2. The pheripheral equipment associated with the central controller 1 comprises a memory unit 13, a keyboard 70, a data evaluation subsystem 19, and a data readout device or devices 64.

The central controller 1 provides the hardware and software facilities necessary for the subsystem control, data management, decision making, and reporting required of the audio/video quality monitoring system (hereinafter referred to as AVQMS). Memory unit 13 provides extensive storage, preferably in the form of disc storage, to permit rapid access to programs, signatures, and other data. The data readout device 64 can be a single display station or may comprise a plurality of display stations to permit the operator to observe communications from the central controller concurrently at different locations. Keyboard 70 could be accessed at a single location or could be made available at each data readout device 64. The keyboard is used to select options from the AVQMS main menu and respond to the prompts that are issued as a result of each selection. Accordingly, complete control of the recording equipment to deposit the test signals on the pre-mastering tape, control of the operation of the units under test, and commands to the central controller are systematically effectuated at the keyboard.

Figure 2:
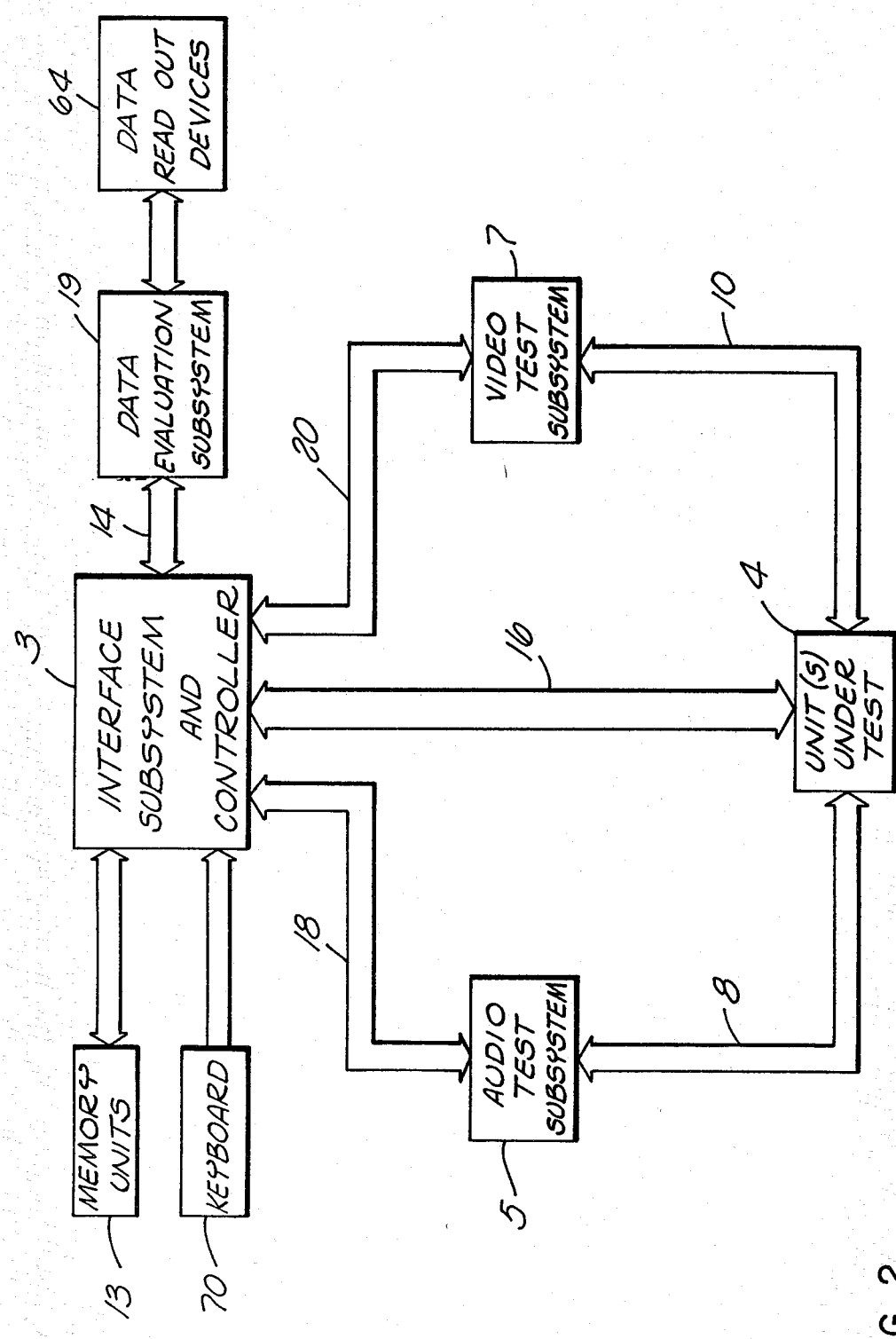
FIG. 2 shows a modified version of FIG. 1 in which, rather than having a central controller, the audio and video test subsystems communicate with and are under the control of an isolated and independent interface subsystem and controller.

While FIG. 1 shows a single central controller 1 with multiple interface subsystems 3, an alternative to such a "centralized" system is the arrangement of FIG. 2 in which each interface subsystem 3 is inclusive of its own perhaps less sophisticated, controller, and has its own memory unit 13, keyboard 70, and data readout devices 64. FIG. 2 further shows a slightly more detailed communication link between the various components of the interface, test, and evaluation subsystems. The communication link 18, among other things, is used to request program load and start of execution by the interface subsystem and controller 3, send measurement data to the controller 3 from audio test subsystem 5, and communicate position data to and from the two units for carrying out the recording and acquiring of data at specific locations designated by the operator.

Link 20 is used to load the video measurement programs from the controller 3 to the video subsystem 7, send position data from the controller 3 to the video test subsystem 7, and transmit video measurement data from the video test subsystem 7 to controller 3.

Tape and/or disc position data is also provided between the unit under test 4 and controller 3 through communication link 16.

Communication links 8 and 10 are, respectively, audio and video links to provide subsystem control of the unit under test 4, and to transmit and receive audio and video signals between unit under test 4 and the respective test subsystem.

Figure 3:
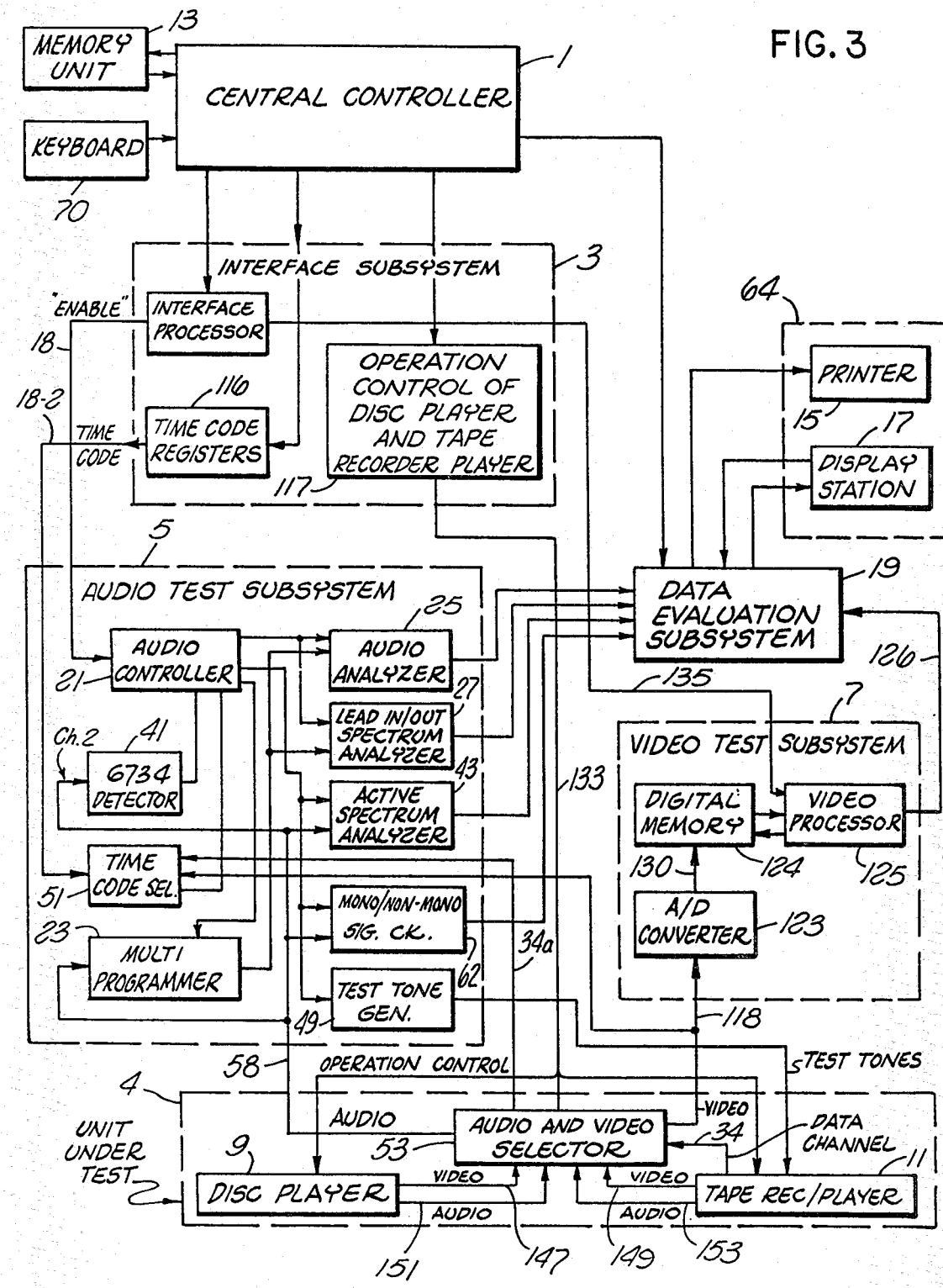
FIG. 3 is a more detailed block diagram of the audio/video quality monitoring system of FIG. 1 showing the interrelationship between the central controller and one of the plurality of interface subsystems and its associated audio and video test subsystems.

FIG. 3 shows a greatly epanded version of the arrangement shown in FIG. 1 with central controller 1 and its associated peripheral equipment associated with only a single interface subsystem 3, audio test subsystem 5, video test subsystem 7, and unit under test 4. To this point, the unit under test 4 has been treated as strickly a player-type unit capable of reproducing audio and video signals from a prerecorded tape or disc. The phrase "unit under test", however, carries with it, for the purposes of this application, a more complex arrangement comprised of a tape recorder/player 11, a disc player 9, and an audio and video selector 53 as shown within the unit under test block 4 in FIG. 3. The disc player is capable of outputting both video and audio signals to the selector 53 on lines 147 and 151, respectively. Similarly, the tape recorder/player 11 outputs video on line 149, and audio on line 153. Later, it will be evident that the audio lines 151 and 153 carry two lines of audio for the purposes of accomodating a sterophonic or two channel signal.

Operation control, i.e., stop, play, reverse, fast forward, rewind, etc., is effected by operation control 117 in interface subsystem 3 via cable 133 shown in FIG. 3 as a single line for simplifying the drawing. Operation control is also effective to select either audio channel, or both, and video from either the disc player 9 or tape recorder/player 11. Audio and video are thus outputted on lines 58 and 118, respectively, leaving the audio and video selector 53. Since the audio and video test subsystems are capable of analyzing audio and video signals from either the disc player 9 or tape player 11, in order to minimize the amount of test equipment in the test subsystems, the audio and video selector 53 is provided to select the audio and video from only one of the program sources at a time.

Tape position is outputted on the data channel output line of the tape player 11, and audio test tones are applied to the tape by tape recorder 11 as will be discussed in connection with more detailed figures later.

Having reference to FIGS. 3 and 4, the function of the audio test subsystem will now be described. The description will carry through the process from receiving a master tape from a customer through tape premastering (to produce a submaster tape), through disc mastering and replication, and finally through tape and disc evaluation processes.

A customer's tape, referred to as a master tape, is not involved in the evaluation process for at lease two major reasons, namely that a certain amount of lead-in and lead-out time is necessary preceding and following the program material, and customer's tapes are often devoid of sufficient lead-in and lead-out tape lengths, and secondly prior handling of the tapes have made the lead-in and lead-out portions unusable for test purposes. Accordingly, upon receiving a customers tape, a duplicate is made, and while the duplicate copy is properly termed a submaster, it is also referred to as a pre-mastering tape preparatory to producing a disc master. In any event, the first step in the process is to transfer the customer's program from the master tape to a submaster or pre-mastering tape. Simultaneously with the transfering of the video portion of the program to the pre-mastering tape, appropriate video test signals are inserted on lines 19 and 20 of the vertical interval. A timed sequence of audio test signals is then recorded at a predetermined location on the lead-in and lead-out portions of the pre-mastering tape. The signals will be used to analyze the audio quality of the signals recorded on the tape and on the disc to be made from the tape. Details of the lead-in and lead-out audio testing will now be discussed.

As indicated previously, audio measurements are taken on test signals applied to the lead-in and lead-out areas of the tape and of samplings of the audio program throughout the active program area.

At the display station of the tape operator, the tape operator selects the test tone generation option from the AVQMS main menu. The operator then winds the tape to a point at least 1200 to 1500 frames in front of the active program area to define a start location in the lead-in portion of the tape. It is to be noted here that, since there is no video program material available, it is not possible to determine tape position or frame number by decoding the frame code number in the vertical interval of the video signal. Accordingly, for purposes of applying test tones to lead-in and lead-out portions of the tape, SMPTE audio time code is recorded on one of the audio channels or on the Q data line of the tape recorder. By reading the SMPTE time code and counting backwards for at least 1200 to 1500 frames, sufficient time is left before the beginning of the program material to insert an appropriate number of audio test tone signals.

Figure 4:
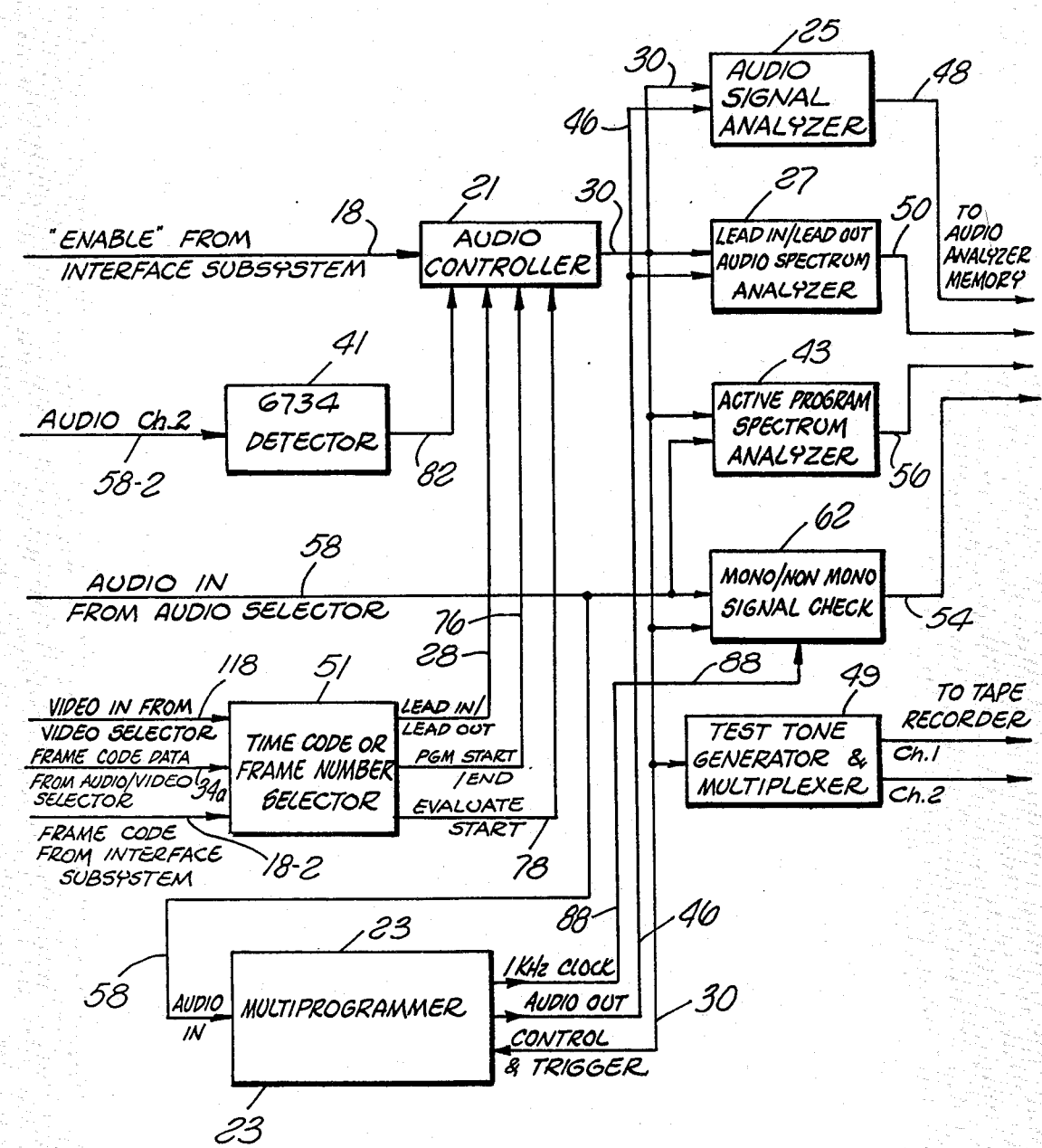
FIG. 4 is a block diagram showing a further breakdown of the audio test subsystem of FIG. 3.

In FIGS. 3 and 4, the data channel from the tape player 11 is outputted on line 34 and is sent to time code selector 51, a second input of which is a time code signal from time code register 116 as set up by the keyboard 70 via central controller 1. The operator thus rewinds the tape on recorder 11 to a position upstream of the start position for the test tones and sets the tape recorder into a recording mode through actuation of operation control 117 over line 133. When the time dode on data channel line 34 matches the time code from register 116, the time code selector 51 sends an output compare signal to the audio controller 21 which then initiates, over line 30, test tone generator 49 to apply test tones to both channels 1 and 2 of tape recorder 11.

In a similar manner, after the test tones have been applied to the lead-in portion of the tape, the operator performs a high speed tape wind to a point corresponding to the end of the active program and enters a second beginning point for the test tones to occur, during lead-out of the tape, beginning at least 150 frames after the program end. Under control of central controller 1, when the operator permits the tape to resume normal speed prior to passing the end of active probram area, a match is again detected by time code selector 51 at at least 150 frames after the program end, the tape recorder is put into record mode, and the test tone generator 49 is enabled by audio controller 21 to deposit test tones on channels 1 and 2 of the tape recorded by tape recorder 11.

In the above description, the manner in which audio test tones are applied to the lead-in and lead-out portions of a pre-mastering tape have been described. It can be appreciated that certain programs lend themselves to a format on the storage medium such that long periods of dead time exist between program segments. For example, a musical group may produce a program in a form similar to that of present day audio disc recording, i.e., with each song contained in a band on the disc. If a videodisc was prepared in the same manner, it is contemplated that the present invention can be utilized to insert audio test tones in between program segments, as well as during lead-in and lead-out locations. Such test signals contained between program segments will not be an undue distraction to the listener and observer, since the test signals will either be not visible or audible to the ultimate user or will be sufficiently short in time duration that it will pass so quickly that it will be substantially un-noticeable. In the discussions to follow, it will be evident that certain test signals are inserted during the vertical interval of the video signal, and the test tones just described will be confined within a time period equal to approximately 12 vertical frame time slots. Under NTSC standards, 12 picture frames would last less than half a second. The advantage of inserting test tones between program segments is, of course, that more of the disc area can be verified for acceptable quality, although testing lead-in and lead-out areas of either the pre-mastering tape or the final videodisc product establishes and extremely high confidence level in the overall quality of the recorded material.

In any event, the method of characterizing the information transfer characteristics of the recording medium basically involves recording, and simultaneously making a first measurement of, known values of one or more test signals on the recording medium, followed by playing back the recording medium and making a second measurement of the recorded test signal or signals. In the manner of establishing a "signature" as a representation of the signal transfer characteristics, and unlike prior art procedures involving merely checking properties of the medium (e.g., magnetic properties of a video tape), deviation levels from the first measurement results are set up as prescribed tolerance limits for the aforementioned second measurement, and the results of the first measurement are compared with the results of the second measurement to determine if the second measurement results are within the prescribed tolerance limits established from the first measurement results. Although applying audio test tones to the lead-in and lead-out portions of the tape have only been described heretofore, this manner of characterizing the information transfer characteristics of a recording medium can involve the insertion and testing of video test signals as well.

As also will be described later, the present invention can apply to analyzing the signal transferring characteristics of a signal processing unit such as a throughput device by utilizing the same unique "signature" technique described in connection with evaluating the recording transfer characteristics of a recording medium. When testing throughput devices, or in generally applying the present invention, analyzing the signal transferring characteristics of a signal processing unit can be accomplished by establishing an input signal of known content, measuring selected parameters of selected parts of such input signal, feeding that input signal to the signal processing unit, measuring the parameters of parts of the output signal from the signal processing unit corresponding to the similar selected parts of the input signal, and comparing the selected parameters of the input signal with the corresponding parameters of the output signal. Again, the tolerance limits for the measurement of parameters of the output signal are derived as deviation levels from the measurement of the corresponding parameters of the selected parts of the input signal. Here again, the tolerance limits for the output signal, as deviations from acceptable tolerance limits established from measurements of the input signal, represents a unique "two tiered" characterization of the transfer characteristics of the processing unit so as to establish an identity of the processing unit according to a "signature" comprised of the accepted deviation levels within which the parameters measured at the output of the processing must fall. This is a significant departure from the prior art test procedures in which an output signal parameter is merely compared with a "shopping list" of calculated values.

Especially when testing the lead-in lead-out, or interband portions of a recording medium, it is important to have the visible or audible test signals to be as short as possible so as to be substantially un-noticeable to he ultimate user. Additionally, when inserting test signals on lead-in and lead-out of a recording medium, the amount of "real estate" must be kept to a minimum, as there are fixed limitations on tape length and disc track capacity within which all test signals and program material must be confined. Moreover, since the present invention can advantageously be used to monitor the quality of videodiscs exiting a production line, it is essential that the amount of time necessary to gather information from the prerecorded disc be kept to an absolute minimum. Thus, not only is the arrangement of FIG. 1 conducive to a high rate of product evaluation due to the multiplicity of audio/video test subsystem arrangements, but each test subsystem can be, utilizing a feature of the present invention, adapted to quickly gather information from a unit under test, store that information, and process it at a later time or with off-line peripheral equipment.

In order to implement the invention while considering the restraining factors in the preceding paragraph, a method of analyzing the signal transfer characteristics of a signal processing unit will now be described in a slightly modified version than previously described, in that advantage is taken of an information storage device which can retain information gathered quickly from the unit under test and which can be accessed later for information analysis. In effect, the method involves establishing an input signal of known content, measuring selected parameters of selected parts of the input signal, storing the input measurement results to define a stored signature of the input signal comprising the selected parameters of selected parts of the input signal, feeding the input signal to the processing unit, measuring the parameters of parts of the output signal from the signal processing unit corresponding to selected parts of the input signal, and subsequently comparing the parameters of the output signal with the corresponding input signature parameters. When it is desirable to carry out the actual evaluation of the output signal measurements at a later time, the method of analyzing just described can be supplemented by a further step in the evaluation process. That is, before comparing the output signal measurement with the stored selected input signature parameters, the measurements of the output signal can also be stored to define a stored signature of the output signal comprising selected parameters of selected parts of the output signal, and the comparing step would then comprise comparing the stored output signal signature with the stored input signal signature. Reference is made to FIGS. 3 and 4 and the following discussion for an understanding of this aspect of the invention.

As will be described later, the audio test tones applied during lead-in and lead-out of the tape or disc are preceded by a short burst of the 6734 audio tone. It will be assumed that the audio recorded and retrieved from the recording medium will be at least two channels of audio, the test tones being applied to both channels in a selective manner, and the 6734 head tone being recorded and retrieved from only one channel (e.g., channel 2 of a two channel audio program). This head tone identifies the beginning of the audio test tone sequence, and the audio on line 58 (FIG. 3) or line 58-2 (FIG. 4) from the audio and video selector 53 is routed to the 6734 tone detector 41. The output of 6734 detector 41 is routed over line 82 to the audio controller 21 which provides, under internal process control, all of the timing functions for the remainder of the audio test subsystem 5.

Audio controller 1 is enabled preparatory to the system recognizing the 6734 tone burst by the operator, through keyboard 70, central controller 1, and interface subsystem 3 by the sending of a request to the audio subsystem to load its internal acquisition program and to activate the audio test subsystem.

At the time audio test signals were generated and applied to the tape, as discussed earlier, a SMPTE start code is entered by the tape operator to indicate the start of active program as expressed in hours and minutes. Similarly, a SMPTE end code as entered by the tape operator indicates the end of active program as expressed hours and minutes. Thus, upon command from the operator to perform tape or disc evaluation, the central controller 1, via interface subsystem 3, enables the audio controller 21 in the audio test subsystem 5 over line 18 with an "enable" signal.

The central controller then instructs the operator to rewind and start the tape or disc from the beginning. The central controller sends the SMPTE start code minus 25 seconds to the interface subsystem 3 and loads it into time code registers 116. In the same manner as previously described with depositing the test tone sequence to the pre-mastering tape, time code selector 51 alerts the audio controller 21 over line 76 that lead-in of the tape or disc is being read. With the audio controller 21 now enabled, detection of the 6734 tone burst initiates the action of audio controller 21 to perform its timing sequences for the various analyzing functions of the audio test subsystem over line 30. One of the output control signals over line 30 is a control and trigger signal routed to the multiprogrammer 23. Upon receipt of the control and trigger signal, multiprogrammer 23 digitizes the segmented audio test tones on line 58, stores the digitized version of the test tones in memory, and under control of the audio controller 21, converts a selected segment of the audio test tones to a continuous analog representation and sends such representation over line 46 to audio signal analyzer 25 for general analysis, and to audio spectrum analyzer 27 for spectrum analysis of the lead-in and lead-out test tones. Direct audio on line 58 from the audio/video selector 53 is routed to an active program spectrum analyzer 43 and a mono/non-mono signal check 62, the former performing spectrum analysis of selected portions of the active program material, and the latter making a determination as to whether or not the two audio signals on the two audio channels of the playback audio are substantially the same or different, thereby indicating that the audio portion of the program is either monophonic or non-monophonic. The term "stereo" is not used in describing the function of the signal check block 62, since the invention is equally suited for analyzing audio signals on the two channels in the form of monophonic, stereophonic, or totally separate audio tracks. An example of the need for performing analysis on individual tracks totally separate from one another, i.e., the non-monophonic signal check, is that of a video program in which the audio portion accompanying the video portion is bi-lingual, i.e., upon selection of either audio channel one or two, a different language can be selected to accompany the visual portion of the program.

The outputs of each of the signal analysis blocks of the audio test subsystem are routed to a data evaluation subsystem 19 which, under instructions from the operator through central controller 1 compares the audio analysis results with standards, i.e., performs a signature comparison, and outputs the results of the evaluation onto a printer 15 or visual display 17.

With specific reference to FIG. 3, the video from audio and video selector 53 over line 118 is routed to the video test subsystem 7, the video signal being converted from analog to digital form by A/D converter 123, the digitized version being stored in digital memory 124 and selectively processed or analyzed in video processor 125. The output of video processor 125 is thus a video "signature" of the recovered video signal, is outputted over line 126 to the data evaluation subsystem 19, and the thus obtained output "signature" is compared with a stored signature in the data evaluation subsystem 19, the results of which is printed on printer 15 and/or displayed at display station 17.

The time code or frame number selector 51 shown in FIG. 4 is the function block which compares frame code numbers from interface subsystem 3 generated by central controller 1 and ultimately from the operating of the keyboard 70 by an operator, with either SMPTE time codes or vertical interval time codes and output addresses identifying the lead-in audio test tone start frame, the lead-out audio test tone start frame, both on line 28, and the program start and end frames on line 76 and evaluate start frame on line 78. Audio controller 21 thus receives an enabling signal from line 28 when the audio test tones are to be recorded or analyzed at the lead-in and lead-out locations, and these frame positions on the recording medium are derived from decoding the SMPTE time codes either on the cue data channel of the tape player or audio channels of a tape or disc player. Similarly, the program start and end signals on line 76 and evaluate start on line 78 enable audio controller 21 to initiate and periodically check active audio as a result of decoding frame time codes from the vertical interval of the video received from the audio/video selector 53 on line 118.

For purposes of illustration and to insure consistency of terminology used in this specification with that normally used and accepted in the art, references made to FIG. 5 which shows a schematic representation of a length of video tape containing a lead-in portion, a lead-out portion, and a program material portion sandwiched therebetween. Assuming tape motion is to the right in FIG. 5, the beginning of the tape 55 has a lead-in portion 57, a test tone zone 59 on the lead-in portion, and a guard portion 65 of lead-in, all followed by the program material portion 67. The test tone zone 59 on lead-in is comprised of two tracks of audio test tones, track 1 being represented by numeral 61 and track 2 by numeral 63.

In symmetrical fashion, following the program material portion 67, a lead-out guard portion 65 precedes test tone zone 59 comprised of audio track 1 shown at 61, audio track 2 shown at 63, and lead-out portion 57 extending to the end of the tape.

The dotted line at 66 represents a control track for use in synchronizing the tape drive of the tape recorder upon playback, among other things, and a cue track 68 upon which can be recorded a variety of signals, including time code frame numbers, editing data, additional audio, etc.

Although the tape configuration shown in FIG. 5 is known in the industry as the quad format, any of the other known formatting systems can be incorporated for use with the present invention, for example, the one-inch helical scan system of the ¾-inch helical scan cassette system. The quad format represented in FIG. 5, however, will be referred to in the following discussions, and the cue track 68 will be what is referred to hereinafter as data channel, the player output carrying the data channel information identified as line 34.

Referring to FIG. 6, in order to have a known measurable set of standards up on which to qualify audio signals, a segmented signal train of appropriate test signals is recorded on both the lead-in and lead-out areas of the pre-mastering tape. In a preferred embodiment of the invention, audio test tones are recorded on both audio channels of the tape and occupy 12 vertical frame times in corresponding areas on both of the audio channels as represented by the vertical dotted lines in FIG. 6. Preceding the 12 frames of test tones, on channel 2 a 6734 test tone location signal is applied immediately in front of the first frame on channel 2 in order to locate the test tone area when evaluating the tape or subsequently prepared disc copy.

The top half of FIG. 6 schematically shows the two audio channels 61 and 63 with a literal designation of the type of signal contained in each frame time period of each audio channel. The bottom half of FIG. 6 is a drawing of the approximate waveforms of the signals identified in the upper half of FIG. 6. During the analysis function of the audio test subsystem, it should be noted that, although in normal play mode, the information contained in all 12 frames will occur in a time less than one half second (12/30 sec. = 0.4 sec.), the available test equipment is not capable of performing complete measurements in such a short period of time, and other processing of the signals is necessary in order to carry out the measurement function. Briefly described earlier, and to be described later in more detail, was a method and means for digitizing and storing the recovered analog test tones and converting them to continuous analog signals for analyzing at a later time.

In any event, when the contents of the first segment of the audio test tone train is analyzed, phase amplitude, signal-to-noise, and harmonic distortion measurements are taken. Since the two channels contain, for the durations of segments 2 and 3, one kilohertz on one channel simultaneously with DC (i.e., no signal) on the other channel, cross talk measurements from one channel to the other are taken during segments 2 and 3.

During segments 4 and 7, each channel contains a DC level, and thus noise level measurements are taken during these time slots.

A prescribed summation of 60 HZ and 7 KHZ tones is contained on segments 5 and 6, and when analyzed with appropriate test equipment indicate the intermodulation distortion level through the recording and playback process.

Finally, segments 8–12 contain audio tones continuously sweeping through a wide range of frequencies, i.e., from 20 HZ to 20 KHZ, and the analysis of the recovered test tones in this area reflect the frequency response of the transfer characteristics.

It should be noted that, in all of the analyzing of the pre-mastering tape or disc copies or of a throughput device, the "signature" during tape evaluation or disc evaluation represents the personality, so to speak, of the transfer characteristics either through the throughput device or through a recording/playback process, and the electronics necessary for recording and playback processing purposes are assumed to be theoretically non-contributory to the "signature" or compensated for by appropriate pre-emphasis or pre-distortion techniques. This is especially true in the recording/playback process in which the electronics in the signal path are generally contributory to degradation of the signal in a minute or insignificant proportion as compared with that attributed to the transducer components during the depositing and recovering of signals from a magnetic tape or videodisc. Thus, for the purposes of this invention, the contribution to the electronics involved in the recording/playback process is considered negligible.

Turning now to FIG. 7, a schematic diagram is shown which produces the audio test tones. A test tone generator and multiplexer 49 contains a plurality of function generators including a 6734 generator 73, a 1 KNZ tone generator 75, a 60 HZ tone generator 77, a 7 KHZ tone generator 79, a sweep generator 81, and a DC source 83.

In the test tone recording process, upon command from the keyboard operator, an enabling signal over line 18 is routed to audio controller 21. The tape is rewound and put into play condition, whereupon the SMPTE code derived by the central controller 1 is loaded into lead-in location register 87 and sent over line 86 to comparator 91. As the tape progress in its play mode, a position detector 85 reads the SMPTE time code off the data channel tape recorder 11 and sends the detected position information over line 84 also to comparator 91. After enabling of the audio controller 21, the controller 21 interrogates comparator 91 for detection of correspondence between the present position detected by position detector 85 and the predetermined point at which lead-in test tone signals are to be applied, the latter location information taken from lead-in location register 87. When a comparison is found, an output of the comparator 91 over line 28 initiates the subsequent multiplexing action under control of audio controller 21. Basically, controller 21, over line 72, selectively and at a video vertical repetition rate enables one or two of the function generators feeding multiplexer 71. Multiplexer 71 then sums the outputs of the selected function generators, and outputs the desired combinations shown in FIG. 6 over lines 76 and 78 to be routed to the input channels 1 and 2 of tape recorder 11.

Simultaneously with detection of the compare signal on line 28, audio controller 21 outputs a record enable signal on line 80 to tape recorder 11 in order to change the recorder from the play to the record mode so that the audio test tones will be deposited, in the fashion shown in FIG. 6, on the separate audio channels.

Control of forward, reverse, play, and stop motions of the tape recorder 11 are effectuated under control of audio controller 21 over the lines in cable 133. Not shown in FIG. 7 and communication links between the central controller 1, interface subsystem 3, and the audio test subsystem 5 which communicate the operator's keyboard commands to the audio controller for effectuating the various motion functions of the tape recorder 11. These are typical control communication paths which can be implemented in a variety of known ways.

FIG. 8 shows the audio test tone generation timing. In view of the limited dimensions of a page of drawing, alpha/numeric codes are inserted in FIG. 8 to illustrate the contents of the segments of the audio test tone train on each channel. The signal symbols shown in FIG. 8 have the following correspondences:

T refers to the 6734 tone;
1K refers to the 1 KHZ test tone;
M represents the summation of the 60 HZ and 7 HZ test tones;
S represents the sweep function signal, and a blank line represents a DC or zero signal component.

In FIG. 8, the beginning of the tape is at the left of the figure, and track 1 format waveform 90 has a lead-in portion 57 inclusive of lead-in tones 61, 63, followed by a guard portion of lead-in 65, program material 67, a lead-out guard band 65', and lead-out portion 57' including lead-out tones 61' and 63'.

The data channel output shown schematically in the third line of FIG. 8 represents at each vertical marking the SMPTE position code data at a vertical frame rate. Position A indicates the SMPTE time code which is sufficiently upstream of the program material (generally 25 seconds or more) and the position at which recording of the audio test tones is to begin. The first position, position A, is that of the 6734 tone followed by the actual test signals referred to in FIG. 6. The position A SMPTE code having been detected by position detector 85 and compared with the start position location at comparator 91, audio controller 21 enables the tape recorded over line 80 with a waveform shown in the fourth line of FIG. 8. The record mode shown as record enable waveform 93 indicates that tape recorder 11 is placed in the record mode during the positive duration of the record mode waveform. Since the test tones require less than a half second of time, the guard bands 65 and 65' are still on the order of 24½ seconds, providing a safety factor so as to avoid any inadvertent erasing of the program material on the extreme ends of the tape.

The third line of FIG. 8 also shows, at position B, the coincidence of lead-out SMPTE location number stored in location register 89 and compared with the present position from position detector 85 at comparator 91.

A similar recording procedure is then effectuated under audio controller 21 control by enabling the record mode of tape recorder 11 over line 80 at the time position B code is detected. The resultant pre-mastering tape thus contains the 12 segment audio test tone train at both lead-in and lead-out segments of the tape, and this location of test tone data will be carried through the disc mastering, replication, and playback processes so that audio analysis of either the tape or disc can be made in the manner briefly described earlier in this description.

A general block diagram of the audio analyses logic is shown in FIG. 9. In the manner described in connection with FIG. 3, both a disc player 9 and a tape recorder/player 11 are shown connected to an audio selector 53 (the audio portion of audio and video selector 53) the two audio outputs of disc player 9 being carried by line 32, while the two channels out of the tape player 11 are carried by line 16. Channels 1 and 2 audio out of the audio selector 53 are carried on lines 58-1 (channel 1) and 58-2 (channel 2). It will be noted that only channel 2 audio is sent to the 6734 detector 41, consistent with the waveforms shown in FIG. 6. The audio on line 58-1 enters A/D converter 37, is digitized thereby and sent over line 36 to the digitized test tones memory 33 for storage. Under command of the audio controller 21, a control and trigger signal on line 30 is effective to cause recirculate control 99-1 to recirculate a selected test tone segment in the digitized memory 33 and output that selected tone segment in a continuous manner over line 38 to D/A converter 39. The continuous representation of the selected test tone is then routed over line 46 to the audio signal analyzer 25 and lead-in/lead-out spectrum analyzer 27 as described briefly earlier. The outputs of the two analyzers 25 and 27 are routed over lines 48 and 50 to audio analysis memory 47. The memory unit 45 thereof has information written into it by memory write gates 44 which receive outputs from multiplexer 42 in a timed manner under control of audio controller 21 over line 30. Thus, all inputs to the multiplexer 42 are sequentially acted upon to be stored in memory unit 45 for later evaluation by the evaluation subsystem.

The analysis of the appropriate locations during lead-in and lead-out for recovering audio test tones to be analyzed is controlled by outputting a signal on line 28 from comparator 91 when the appropriate frame numbers during lead-in and lead-out have been detected. Whether the audio test subsystem is analyzing the tape or the disc, present position data is received over lines 34 and 118, respectively by position detector 85. The present position is then routed over line 84 to comparators 95 and 91. Comparators 95 and 91 operate in similar manners, i.e., a desired tape or disc position is contained in location registers, and the contents of such registers is compared with the present position data to enable the audio controller 21 at coincidence thereof. In FIG. 9, the two comparators 91 and 95 are shown separately, since they perform slightly different functions in carrying out the audio analyses.

That is, comparator 95 makes a comparison of the time code contained in the video information of the active program material so as to identify program start, program end, and various points along the program material content at which active audio and/or video tests are to be carried out. On the other hand, since there is no video contained in the lead-in and lead-out portions of a tape or disc, comparator 91 must rely upon SMPTE time code detection from either the data channel out or audio out signals of the tape and disc player.

After lead-in analysis has been accomplished, the audio test subsystem proceeds to analyze active audio program material at predetermined time intervals during the active programming. Comparator 95 is thus provided with present position data from the vertical interval of the video signal, and location register 109, when matched with present position, outputs a program start signal to the audio controller 21 to ready the audio controller for subsequent active program analysis control. At the first predetermined location in the active program wherein audio is to be analyzed, location register 111 will have a position location match with present position from position detector 85, and comparator 95 will output an evaluate start signal over line 78 to audio controller 21. Control then of two additional audio analysis functions of the audio test subsystem commences under control of audio controller 21 over the control line generally designated at 30 in FIG. 9.

The audio from both channels of the playback device exiting audio selector 53 enters active program two channel spectrum analyzer 43. Analyzer 43 contains two analyzer arrays, one for each of the audio channels. Since the audio to be analyzed during active program material is continuous, it is not necessary to digitize and recirculate audio segments in the multiprogrammer 23 as was necessary with the short segment deration test tones of the lead-in and lead-out portions of the tape or disc. Accordingly, the audio entering spectrum analyzer 43 is selected audio direct from the playback devices. Both arrays 113 and 115 of the spectrum analyzer 43 operate in identical fashion, i.e., a 45 second audio waveform from each audio channel is acquired and transformed into two frequency spectrum of 128 separate frequency points for each channel. Point spacing is in 200 HZ increments, and each value analyzed at each point is expressed in decibels. The frequency spectrum for each sample represents a unique audio "print", and the 128 points for each channel have their values contained on lines 56 and 60, respectively, and these values are multiplexed with the other analyzer signals in multiplexer 42, and ultimately stored in memory unit 45. As was suggested earlier and discussed in detail later in this description, the evaluation of all of the analyzing signals comprise a part of the signature for both the tape and the disc signal outputs, and thus in the final printed report of the evaluation, and using the frequency spectrum analysis as an example, represents the results of subtracting each point in the disc frequency spectrum from the corresponding point in the tape frequency spectrum. An analogy can be gathered from this as regards other "prints" obtained from the individual analyses of the audio and video signals which comprise the ultimate "signature" established during tape evaluation and disc evaluation.

Another part of the "signature", and therefore another imprint to multiplexer 42, is a signal on line 54 indicating whether or not the audio portion of the program is monophonic or non-monophonic. The signal is developed in the mono/non-mono signal check block 62. Channel 1 and channel 2 audio are received by block 62 over lines 58-1 and 58-2, respectively, these two signals being compared with each other in amplitude comparator 105. Mono/non-mono testing is performed at intervals throughout the active programs areas of the tape or disc. Each test consists of 65,536 measurements, the measurements being spaced one millisecond apart.

Block 62 illustrates a preferred embodiment of the mono/non-mono check in which the amplitudes of the two audio channels are continuously compared in comparator 105 with the difference between the two audio channels being outputted on line 84. If the amplitudes are within 5% of each other, threshold detector 107 does not react to the signal on line 84, there is no output on line 86, and a 1 KHZ clock 103 is applied over line 88 to the mono/non-mono counter 101. Without an input on line 86, i.e. the amplitudes of the audio on both audio channels are within 5% of one another, counter 101 is incremented by 1 count. One millisecond later, as determined by the pulse recurrent rate of 1 KHZ clock 103, counter 101 is again incremented if the amplitudes are again within 5% of one another. This procedure continues in like manner until the measured amplitudes between the two audio channels are greater than 5% in difference, at which time threshold detector 107 outputs a step waveform on line 86 to inhibit counter 101 from incrementing one count. As a result, after counter 101 permits 65,536 clock pulses to increment or not increment the counter, the accumulated count is sent over line 54 to multiplexer 42 and stored in memory unit 45 by memory write gate 44 to become a part of the "signature" for the unit tested.

Obviously, in the printout of the analysis performed by the audio test subsystem, the greater the number count on line 54, i.e. the closer the accumulated count is to 65,536, the more definite it is that the two audio signals on the two audio channels are the same, i.e. the audio program is monophonic. An accumulated number count in the "signature" of 30,000 to 50,000 would indicate that the audio program is likely sterophonic, the greater the stereo separation on the two channels, the lower the number count will be. Finally, an accumulated number count of 30,000 or below would indicate the likelyhood that the programs on the two channels are entirely different audio programs, for example a bi-lingual program in which each channel has its own peculiar language version of the audio portion of the program.

An alternate implementation of the mono/non-mono check block 62 is represented by the dotted line 88' from 1 KHZ clock 103 to amplitude comparator 105. In this embodiment, the amplitude of the audio on the two channels 58-1 and 58-2 are not compared continuously, but rather are compared under the gating action of the 1 KHZ clock, that is, a comparison is made every millisecond. Comparator 105 is then arranged such that, when the amplitutdes of the signals of the two audio input lines 58-1 and 58-2 are within 5% of one another, an output pulse is routed to threshold detector 107 along line 84. The output of threshold detector 107 is then a step when the amplitudes on the two audio channels are within 5% of one another and DC when the amplitudes are greater than 5% of one another. Since comparator 105 is clocked at a 1 KHZ rate, the maximum frequency step signal out of threshold detector 107 is also 1 KHZ, and when a stereophonic or non-monophonic program is being and counter 101 is incremented fewer times. Again, assuming that amplitude comparisons are made in comparator 105 65,536 times, this embodiment of the mono/non-mon signal check merely counts the number of times that the amplitudes of the samples from the two audio channels are within a prescribed percentage tolerance of one another (5%) to provide information regarding whether or not the signals on the two channels are substantially similar in informational content.

Figure 10:
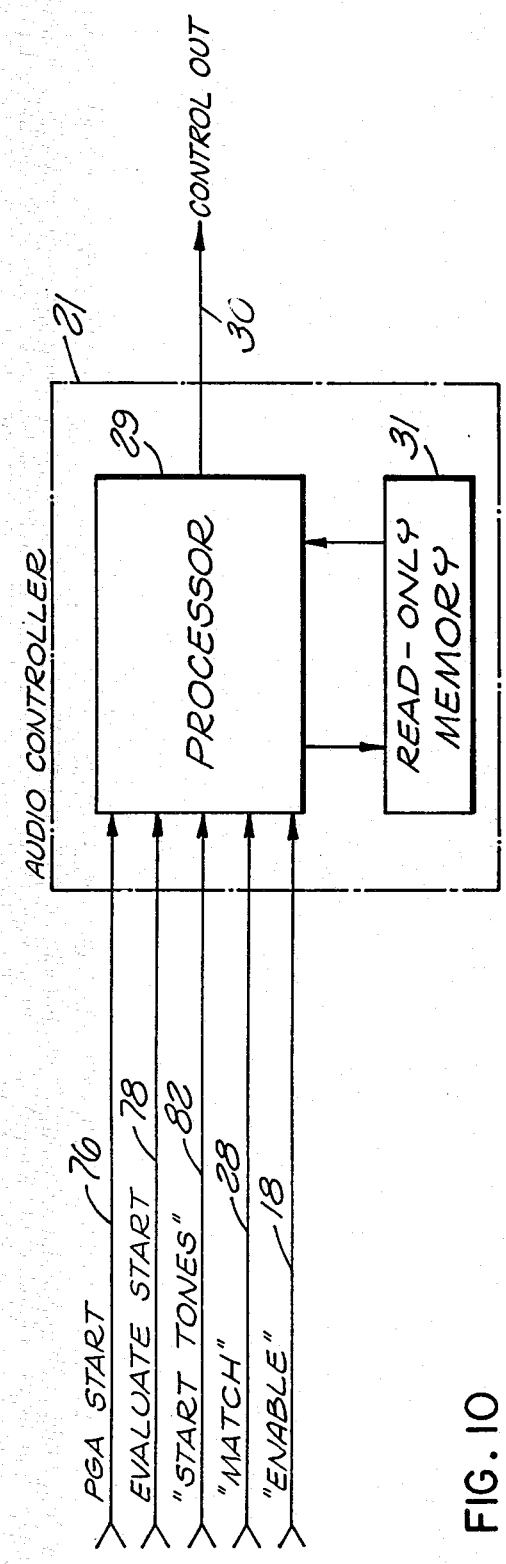
FIG. 10 illustrates a more detailed portion of the audio analysis logic, and in particular, the audio controller portion thereof.

FIG. 10 is a more detailed diagram of the audio controller 21, showing that is basically comprised of a processor 29 and read-only memory 31. Read-only memory 31 can take on any of various forms of memory such as tape cassette, hard wired or burned in micro chips, and the like. The purpose of the memory is to set up the control functions of the audio controller in a prescribed manner upon enablement by the central controller 1 and/or interface subsystem and line 18, the processor instructs the read-only memory 31 to prepare the processor 29 for outputting its control logic on line 30 depending upon subsequent signals received by processor 29. The functions of the program start, evaluate start, start tones signal, and lead-in/lead-out "match" signals have been explained earlier. In this connection, although a single line 30 is shown as "control out" in FIG. 10, it can be appreciated that, due to the number of times in FIG. 9 with which the audio controller must communicate, line 30 is merely representative of a cable containing multiple control lines, as necessary, to control the various functional blocks of FIG. 9.

Figure 11:
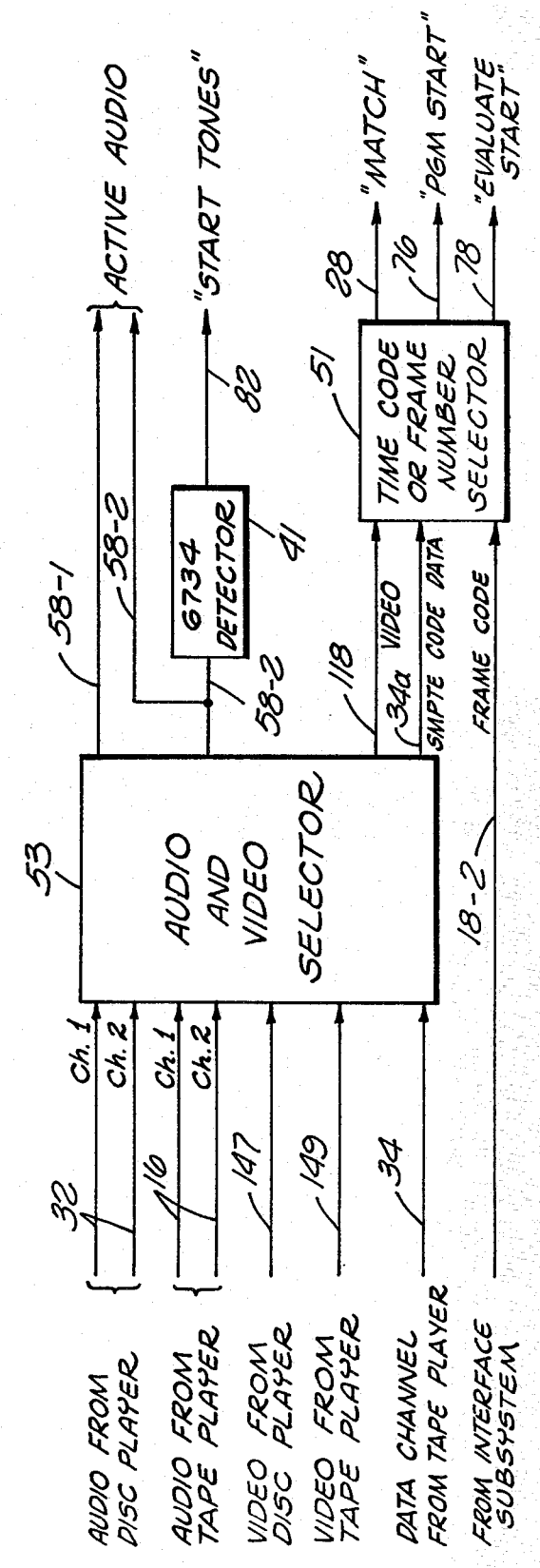
FIG. 11 shows details of a portion of the audio analysis logic, and in particular, the audio and video selector, 6734 tone detector, and time code or frame number selector.

In FIG. 11, there is shown, in more detail than before, signal routing associated with the audio and video selector 53 and time code or frame number selected 51. Since the AVQMS is capable of analyzing and creating a "signature" for a tape program or disc program, in the interest of economy and efficiency and without loss of quality, the audio outputs from the two channels of the disc player are shown entering audio and video selector 53 on lines 32, while the comparable outputs from the tape player are shown on lines 16. Under operator control, audio and video selector 53 outputs the active audio portion of the program on line 58-1 and 58-2. It will be recalled that only channel 2 audio is routed to the 6734 tone detector 41, since that tone is only deposited on channel 2. A "start tones" signal is thus produced by detector 41 on line 82 as discussed in connection with FIGS. 9 and 10.

The lead-in and lead-out identification signal, herein referred to as the 6734 tone or code signal, can, in a simplified system be comprised of a non-standard frequency such as 6734 HZ lasting the time of one picture frame preceding the sequence of test tones in the lead-in and lead-out portions of the tape or disc. However, a better identification signal is preferably a coded form for a sequence of numerical digits such as 6, 7, 3, and 4. The code is a self-clocking digital representation of the number series 6734 which is chosen so as to remove from chance (for all practical purposes) the possibility that any other randomly recovered signal from tape or disc would falsely appear to be the identification signal. The coded digits are represented in binary by switching between two square wave source tones, a 1 KHZ tone and a 2.5 KHZ tone, according to 1 and 0 binary states, respectively. Upon detection by 6734 detector 41, the transitions attributed to the 1 KHZ tone are interpreted as logical 1's, while the transitions attributed to the 2.5 KHZ tone are interpreted as logical 0's. Upon detection of a proper combination of 1's and 0's making up the binary representations of 6, 7, 3, and 4, detector 41 outputs a "match" signal to indicate that the series of lead-in and lead-out test signals follow.

The encoding techniques briefly described above, are described in greater detail in a previously filed application Ser. No. 68,530 filed Aug. 22, 1979, entitled "PROGRAMMED VIDEO RECORD DISC AND RELATED PLAYBACK APPARATUS", now abandoned in favor of a continuation Ser. No. 210,921 filed Nov. 28, 1980.

Although the discussion so far has involved processing, analyzing, and evaluating audio program material, video signals are utilized in the audio test subsystem for the purpose of determining when active audio is to be analyzed, and such information is derived from the frame number codes in the verticle interval of the video signal. Accordingly, the video from disc player on line 147 and the video from tape player on line 149 are routed to selector 53, and depending upon which program is to be analyzed, disc or tape, an output video signal on line 118 is routed to frame number selector 51. When the predetermined frame code from the interface subsystem on line 18-2 is compared with the video frame number code in selector 51, a "program start" signal is generated on line 76 upon coincidence of the first frame of the active video program with the predetermined frame code number, and subsequently an "evaluate start" signal is generated on line 78 upon coincidence of the predetermined points of analyzing the active audio portion of the program with predetermined frame codes. Since audio analyzing is accomplished in a rather short period of time as compared with the length of most programs (e.g. 45 seconds for spectrum analysis and 65.5 seconds for mono/non-mono check), a number of predetermined frame codes on line 18-2 received by selector 51 will result in a plurality of spaced "evaluate start" signals on line 78.

As explained earlier, since the lead-in and lead-out portions of the program do not contain video information, the data channel output of the tape player on line 34 or, alternatively audio containing SMPTE code from the disc player is routed to selector 51 and compared with the appropriate frame code (in SMPTE code) to output a "match" signal on line 28 to initiate either recording or retrieving the train of audio test signal segments of the lead-in and lead-out test signals.

Details of the multiprogrammer 23 is shown in FIG. 12. The purpose of the multiprogrammer 23 is to receive audio in on line 58 from the lead-in and lead-out portion of the program and to output a continuous version of the audio on line 49. Additionally, multiprogrammer receives a control and trigger on line 30 for synchronizing the inner workings of the multiprogrammer, and outputs a 1 KHZ clock as the one millisecond timing signal for mono/non-mono signal check 62.

The segmented audio test signal train is received on line 58 and converted to digital form by A/D converter 37. Upon sensing the 6734 tone in detector 41, audio controller 21 sends control and trigger signals along line 30 to the program storage 35, A/D converter 37, and timer pacer 103.

Control to program storage 35 merely resets the internal program of the multiprogrammer 50 as to acquire, recirculate, and output audio at the appropriate times. The trigger on line 30 to pulser 97 and pacer 103 is generated upon detection of the 6734 start tone. Typically, pulser 97 outputs a 32 KHZ square wave for activation of the A/D converter 37, while pacer 103 outputs a 64 KHZ square wave for digital-to-analog conversion timing in D/A converter 39. The 1 KHZ clock output on line 88a is the basic timing source for the mono/non-mono check block 62. In this connection, the 1 KHZ clock circuit 103 in FIG. 9 shapes the clock for distribution within the mono/non-mono check block 62.

With the digitizing pulses configured as described above, A/D converter 37 converts the real-time audio in on line 58 and stores it in acquisition storage 33. It should be recalled that, subsequent to the 6734 start tone, twelve segments of audio test tones are received by multiprogrammer 23, and at a 30 frame per second rate, all twleve frames will be written into acquisition storage 33 in 0.4 seconds.

In order to analyze a continuous form of each segment of the audio test train in lead-in and lead-out, program storage 35, under control of audio controller 21, retreives, in turn, each selected segment of the audio test tone train, recirculates it via control of recirculate control 99 over line 80, and causes a continuous form of the particular selected segment to be outputted over line 38. D/A converter 39, timed by pacer 103, then outputs a continuous analog version of the selected audio test tone segment over line 46 for analyzing by the signal analyzer 25 and spectrum analyzer 27 shown in FIGS. 4 and 9.

The functioning of the audio test subsystem has been described in terms of signal routing between circuit blocks of the foregoing figures. FIG. 13 should serve to clarify the signal routing details and provide a timing analysis of the many signals described only verbally heretofore. The audio waveform of channel 1 is shown schematically at 90 in FIG. 13, while the channel 2 waveform is shown at 92. The beginning of the tape or disc is to the left in FIG. 13. Both channels 1 and 2 show the test tones in lead-in, followed by program material, followed by lead-out test tones.

Since only lead-in and lead-out test tones are acquired from the recording medium of a rate too fast for analyzing, only these test signals need to be digitized, stored, and recalled for further analysis at a later time. Accordingly, digitized audio waveform 94 indicates that multi-programmer 23 is performing its digitizing under control of audio controller 21 only during lead-in and lead-out time. As explained earlier, analysis of the program material is accomplished in real-time and need no digitizing technique applied.

"Program start" waveform 96 occurs as a single pulse at the beginning of the program material. As explained earlier, this pulse is sent to the audio controller 21 to clear and reset the internal audio processer preparatory to taking active audio samples for analysis.

On the other hand, "evaluate start" waveform 98, occurs periodically throughout the program material and is shown by way of example in FIG. 13 as occurring four times. Since the longest active analyzing time is approximately 65.5 seconds, it is obvious that "evaluate start" pulses could occur at a corresponding or slightly lower rate. Depending upon the confidence level in the analysis results, the extent of desired disc or tape evaluation consistent with available hardware and time restraints, and the relative importance of each particular parameter analyzed, evaluation of the active program material can be varied by adjusting the pulse repetition rate of the evaluate start signal in order to optimize the above-mentioned parameters.

In any event, FIG. 13 shows an "evaluate start" pulse at the begining of program material, and as a result, the count from counter 101 (FIG. 9) begins to be accumulated. Waveform 100a shows a plurality of counts occurring at a 1 KHZ rate, and assuming that a theoretical monophonic signal has been recorded in both audio channels 1 and 2, most, or all of the 65,536 samplings are shown to exist, thereby indicating the presence of a monophonic program on the two audio channels. On the other hand, waveform 100b illustrates the effect of acquiring and analyzing a non-monophonic audio program on the two channels, and only occasional 1 KHZ pulses are present to be accumulated, and the scarcity of counter pulses will accumulate, after 65,536 seconds, to a small number indicating the existence of a non-monophonic program on the two audio channels. It should be appreciated that, due to spacial limitations, the pulses indicated at 102a and 102b of waveforms 100a and 100b, respectively, are only schematic representations of the actual waveforms when viewed on an oscilloscope.

Audio controller 21, over line 80, creates waveform 104 having "save accumulated count and clear counter" pulses 106 applied to mono/non-mono counter 101 so as to output the accumulated count over line 54 to be analyzed by audio analysis memory 47, having reference again to FIG. 9.

In a similar manner, audio controller 21 creates the approximate 45 second enabing pulse 110 of waveform 108 is activate the spectrum analyzer 43, and during the relaxation time after the 45 second analysis pulse 110, a pulse 114 shown on waveform 112 is effective to cause spectrum analyzer 43 to output the test results from the spectrum analyzer, such results being referred to "spectral print" to become a part of the signature after evaluation.

Shown in FIG. 14 is the video test subsystem. The video subsystem 7 comprises essentially two logical units, an acquisition unit 119 and a processing unit 125. Acquisition unit 119 has the capability to acquire a video signal in a controlled manner, convert it from analog signal to digital values in A/D converter 123 and store a digitized signal in acquisition digital memory 124 over line 130. Typically, digital memory 124 has 32K bytes of acquisition memory, and an analog-to-digital conversion results in an 8 bit byte. One of the 525 lines in a frame is represented by 910 conversions or bytes, converted in real-time, each Each picture horizontal line being 63.5 microseconds in duration. The video test signals are encoded during vertical intervals in lines 19 and 20, and under program control of processing unit 125, selected lines or portions of lines from a frame or from consecutive frames may be converted and stored until the 32K bytes of acquisition storage is filled.

Control of the acquisition unit 119 and computation of the acquired data is performed by processing unit 125. The processing unit 125 features a microprocessor computer 120, processing storage 121, and a real-time clock 122. Having acquired and stored the selected video test signals, control of processing unit 125 is effected by a control line 135 from interface subsystem 3. In a manner of control analogous to that associated with the audio test subsystem discussed earlier, microprocessor computer 120 accesses over line 128 the digitized and stored video test signal from digital memory 124 over line 127. Time based from real-time clock 122 over line 129, computer 120 and processing storage 121 interplay to output over line 126 the analog equivalent of the video test signal or portion thereof being processed and route same to the data evaluation subsystem to become a part of the "signature" of the tape or disc being evaluated.

While the concepts underlying this invention apply equally well to all world standard television systems and format, the numerical values and timing parameters given in this specification make reference, as example only, to the NTSC system. FIG. 15 is a diagram showing two consecutive horizontal lines comprising a color frame according to the NTSC system. Field 1 is shown by arrow 170 defining the horizontal interval H at 174, with the vertical interval shown at 176. Field 2, shown at arrow 172 shows the odd field with the vertical interval preceded by 0.5H and vertical synch pulse 178. For conservation of space in the drawing, horizontal lines 11–18 are omitted in the drawing, and lines 19 and 20 preceding the recurrence of the video picture information are made available to contain the aformentioned video test signals. A composite VITS test signal, shown in FIG. 16, is located in each frame in field 1, line 20 and with appropriate measuring devices can provide some 15 measurements of different video parameters.

A combination VITS video test signal is located on each frame in field 2, line 20 and provides some 11 measurable parameters.

Finally, a VIRS test signal as shown in FIG. 18 is located in each frame in both vertical fields on line 19 to provide some 9 additional measurable parameters.

In FIG. 16, the color burst is indicated at 180, the white line bar is shown at 181, a T-step transition 182 follows the line bar 181, a 2T pulse 183 follows the T-step 182, and a stair step or modulated staircase 184 fills the remainder of the horizontal line of information.

Similarly, and with reference to FIG. 17, a white flag 186 is followed by a series of 6 bursts of increasing frequency test signals, known as multiburst, burst 187 being at 5 KHZ, burst 188 at 1.0 MHZ, burst 189 being at 2.0 MHZ, burst 190 being at 3.0 MHZ, burst 191 being at 3.58 MHZ (color burst frequency) and burst 192 being at 4.2 MHZ. A three level crominance test signal 193 follows the multiburst and fills the remainder of the horizontal line of test signal.

In FIG. 18, the VIRS test signal has a phase correcting color burst 195, followed by luminance levels 196 and 197.

The specifications for time period, amplitudes, and rise and fall times shown in FIG. 19 represent NTSC standards for the horizontal blanking and sync pulse with color burst. The specifications given in FIG. 19, when taken together with those shown in FIG. 15 comprise many of the parameters which are to be tested for compliance with NTSC standards. It is common for broadcast companies to have an on-line test system for verifying that the program sent over the airwaves meets acceptable NTSC standards, and this is generally done on a continuous basis. An example of a piece of equipment which is capable of measuring the parameters heretofore referred to is the Tektronix Model 1980 automatic video measurement set. The waveform examples shown in FIGS. 15-19 are thus known standardized waveforms which can be fully evaluated and verified for compliance with NTSC standards by the Model 1980 Tektronix apparatus, and the descriptive and illustrative information contained in this application regarding the particular video test signals and specific parameters tested are presented to indicate the kind of testing which is typically carried out by those skilled in the art. It is to be recognized, however, that the basis for the subject invention has to do with the manner in which the test data is gathered, processed, and used in an evaluation processing scheme. The previous discussions concern the testing of a video tape or video disc signal, comparing it with fixed standard deviation limits, and establishing from the test data acceptable tolerance limitations for each of a variety of parameters so as to form a "signature" against which test results of subsequent testing of other tapes, discs, or copies can be compared. Thus, it is generally not within the scope of this application to discuss the precise manner in which all of the video test parameters are analyzed, but rather in the manner in which the test information is gathered, processed, and evaluated.

An exception lies in the noise test which is generally carried out during vertical interval times of a broadcast program. That is, a noise amplitude measurement is made on a theoretically flat portion of the video waveform, during vertical interval. The noise can be expressed in terms of amplitude. IRE units, a percentage of maximum peak-to-peak signal amplitude, or in decibels as compared with a fixed amplitude level of the video signal. A standard test procedure for evaluating noise levels is to measure the peak-to-peak amplitude of the noise deviation during the horizontal sync pulse which is theoretically to be at a DC level for approximately 4 microseconds. The noise test can be taken during the horizontal sync pulse duration at any of a number of given lines during vertical interval. For example, the noise test can be taken on any of the horizontal sync pulses of lines 10-21 of the waveform in FIG. 15. It could also be taken during the lower transition portin of the vertical sync pulse 176 or 178. Broadcast signals, and even signals from tape reproduced programs have rather randomly produced signal deviations as compared with acceptable standards. In a broadcast situation, a tolerance might be exceeded by the aging or degradation in quality of a component part of the electronics through which the signal passes. In a video tape situation, a defect or blemish on the tape would produce an out-of-tolerance condition at the moment the tape defect is being scanned by the read head, but the next and subsequent defects will likely occur in random fashion, since there is no correlation between physical placement of the recorded program on the tape and the repetition rate of any tape defect. On a video disc, however, and especially on one which uses a constant angular velocity (CAV) format, if the noise test was taken only during vertical interval, only a small percentage of the disc's surface area would be contributory to the noise measurement. This is illustrated in FIG. 21 which shows, schematically, the two vertical interval V-shaped portions 207, and assuming the disc rotates in a counterclockwise direction, the dotted line 208 represents the position at which noise tests would normally be taken, i.e., on a given horizontal sync tip at a given line number of each vertical interval. Even if such a noise test were taken during each vertical interval between alternate fields, it can be appreciated by reference to FIG. 21 that only a very slim localized area of the disc would be evaluated by the noise test. Accordingly, and consistent with one of the objects of the present invention to perform evaluation tests on video discs, the noise test according to the present invention is taken on each horizontal blanking pulse of any desirable portion of video program. As shown in FIG. 20, the back porch 201 of the horizontal blanking pulse following the color burst 180 has a theoretically flat shape during the time indicated by arrow 202. According to the present invention, a noise evaluation is made during the time indicated by arrow 202, and since this is accomplished on each horizontal blanking pulse, substantially the entire area of the disc can be tested for noise problems, and this is shown in FIG. 21 wherein, rather than the radial line of evaluation shown at 208, noise figures are taken from the disc at each of the dash lines 209. Although only two rows of dash lines 209 are shown represented in FIG. 21, it can be appreciated that each of some 54,000 circles of dashed lines 209 would show on a full scale drawing, and therefore it can be appreciated that any blemishes on a disc outside the vertical interval will be taken into account in the noise measurement. This represents a substantial improvement in videodisc quality assurance as compared with the normal noise tests taken only on a single horizontal sync tip 200 as seen in FIG. 20, and then only during vertical interval occurrences.

A block diagram of the circuitry used for effectuating the unique noise test according to the aforedescribed procedure is shown in FIG. 21B. FIG. 21B should be analyzed with a view to FIG. 14 wherein like numbers represent like functional blocks of the two diagrams. In the noise test arrangement of FIG. 21B, video in over line 118 is digitized in analog/digital converter 123 and advanced to a sample and hold circuit 137. Sample and hold circuit 137 makes eight samples of the waveform portion 202, shown in FIG. 20, and stores the results in digital memory 124. The processing of the noise test data is accomplished in separate fields of the video signal. It should also be noted that, since it is necessary for the sampling of the circuit 137 to sample identical parts of adjacent horizontal blanking signals, only the horizontal blanking signals outside the vertical interval are noise tested. Accordingly, typically about 480 lines per frame are sampled for the noise test measurement.

The video of field 1 is routed to mean detector 139-1 which calculates the mean value for the eight samples, and the variance detector 141-1 outputs the variance from the mean, such variance being forwarded to the averaging circuit 152. In like manner, the sampled noise of field 2 is routed to mean detector 139-2, the variance from the mean thereof being detected by variance detector 141-2, and the results also sent to averaging circuit 152. The average of the two noise figures is thus outputted on line 126 as measurement data out, and such measurement data is sent to the data evaluation subsystem to be discussed later.

With reference to FIG. 22, the video analysis logic is shown. Because the testing of different sources of video program material require different control of the sample points for making measurements, a memory 138 is provided to contain a list of frames to be measured. Upon receiving an "enable" signal from interface subsystem 3, controller 142 initiates forward, reverse, stop, and play functions of the disc player 9 or tape player 11 to ultimately cause one of these devices to output its video information over lines 147 and 149, respectively, to video selector 53. In the meantime, controller 142 clears over line 161 counter 140, and the first frame number to be measured is outputted from memory 138 over line 169 to comparator 136. When the video on line 118 out of video selector 53 is decoded as to frame number by frame decoder 134, a comparison in comparator 136 is made, and a "take measurement" signal on line 157 is routed to controller 142. Controller 142 then initiates the testing of the video test subsystem 7 by outputting an "enable" signal on line 175. Simultaneously, controller 142 enables memory write gates 144 so that the video test data on line 126 out of video test subsystem 7 can be stored over lines 167 into video analysis memory 146. The position in memory 146 to which each test analysis signal is to be written is controlled by address bus 165 having coincidence with the frame number under test.

Upon conclusion of memory storage for one sampling of video test signal, the second in the list of frames to be measured is outputted from memory 138 over line 169, and another comparison is made in comparator 136 with present frame number in order to again instruct controller 142 to "take measurement" over line 157. Controller 142 uninhibits memory gates 144 to again write the new test data analysis in memory 146 at the address from counter 140 over address bus 165. Again, controller 142 increments over line 163 counter 140 so that the next frame number to be measured is read out of memory 138.

This process continues until all of the test samples have been taken for analysis by video test subsystem 7 and written into memory 146. The output of memory 146, as discussed earlier, is routed over line 126 to the evaluation subsystem.

FIG. 23 shows a block diagram of the audio/video data evaluation subsystem. As explained in connection with FIGS. 3, 4, 9, 14, and 21B, all of the audio and video analysis data from either tape, disc, or throughput device, is sent to the data evaluation subsystem. Prior to processing in the evaluation subsystem 19, the analytical processing by the electronics has been referred to supra as "analysis". In this specification, the term "evaluation" has the special meaning of processing the "analysis" information in such a manner so as to "evaluate" the unit under test, and in a specific practical application of the invention, such evaluation in tantamount to a pass or fail statement for the unit under test.

Although throughput devices have been described earlier as being evaluatable using the concepts of this invention, FIG. 23 shows the typical evaluation of audio and video from a copy of a master program. A block numbered 211 represents the audio analysis data from the master source of program material, while block 212 represents the analysis of corresponding data from the copy made from the master. Similarly, master video analysis is represented by block 213, while corresponding video analysis of the copy is represented by block 214. An audio comparator 215 compares the master and copy analysis data, and the differences are routed to a printer 15 to enable visual and permanent storage of the list of differences. Similarly, video comparator 216 processes the diffferences in video analysis between master and copy and prints the results in the list of differences. As will be seen in subsequent figures, the audio and video comparators 215 and 216 do more than make mere line-for-line comparisons of the signals from master and copy, but rather involve the unique concept of comparing "signatures" as hereinbefore defined.

FIGS. 24–27 illustrate different "evaluation" schemes utilizing the concepts of the present invention. The first of these figures, FIG. 24, "tape evaluation", shows that a video tape 154 is prepared by recording on program tape recorder 145 the picture and/or sound from a program source 143. Generally, the picture and sound program source is that of a customer's master video tape or a motion picture film. In either case, tape 154 is prepared from the customer's tape or film program source for the purposes of using tape 154 as a pre-mastering tape for eventual use in preparing the disc master. At the time the program is recorded on tape 154 by recorder 155, appropriate video test signals from test signal generator 148 are recorded during the vertical interval portions of the program. In preparing the pre-mastering tape 154, sufficient time is left before the program material and after the program material on the tape so as to allow for insertion of the lead-in and lead-out audio test tones. Thus, at the time the program is recorded on the pre-mastering tape 154, or at a later time, as desired, audio test tones are recorded on tape recorder 150 (or tape recorder 145 if desired), and the resulting tape 154 now contains lead-in test tones, program material, and lead-out test tones.

A player 156 outputs the audio and video signals to their respective analyzer 158, and the characteristics of the test parameters measured by analyzer 158 form parameter list 154 which can take the form of a visual display or hard copy readout. At this point, other than the application of audio test tones during lead-in and lead-out, "tape analyzing" has been accomplished, and the character of the tape is reflected in the analysis of the tested parameters listed in parameter list 164, and this type of analyzing is not uncommon in the tape manufacturing field. The present invention, however, goes beyond mere analysis of a signal source in that, from the parameter list 164, parameter deviation limits are set, either manually or under computer control by limits setter 166. The range of parameter deviations permitted by limits setter 166 can be established by applying a percentage figure to the measured parameter of the parameter list 164 and storing the deviation limits so derived in a signature store 168. Desirably, prior to the listing of the parameter analyzed in parameter list 164, a fixed standards table 162 is used as a common (e.g. NTSC, PAL, or SECAM) standard for comparing the output of the analyzer 158 in comparator 160. For example, where the Federal Communications Commission, SMPTE, EIA, or other standards group has established precise parameter tolerance limitations on audio and video signals, comparator 160 ensures that the parameters listed in parameter list 164 are within such industry standards. On the other hand, limits setter 166 is more in line with acceptable limits permitted by the particular process involved in a particular manufacturer's recording process. Thus, when a copy is made of pre-mastering tape 154, corresponding signals from master and copy are analyzed in analyzer 158 and evaluated in evaluator 171 by comparing the signature in signature store 168 with the output of analyzer 158. The quality of the copy is thus compared against essentially two standards, the industry accepted standards according to standards table 162, and an internal manufacturer's standards set by limits setter 166. As a result, the signal evaluated by evaluator 171 is not merely weighted against fixed industry standards as has been done in the past, but is rather compared against a "signature" which is representative of the character of the recording process which should be repeatable within certain limitations. In this way, the degradation of the copying process can be evaluated against a more realistic reference, i.e., against a previously recorded signal using the same kind of tape, same recorder, and same signal source so that these latter items can be nullified as to their contributory effects.

As compared with analyzing processes which evaluate a recovered tape signal against fixed, often calculated, standards, evaluating a copy, or similar recorded program, against a "signature" permits the manufacturer to pinpoint smaller out-of-tolerance deviations and thus allow isolation of the problem areas of a process so that corrective action can be taken. Similarly, comparing against a "signature" characteristic can show the degrading effect of a process even when the signal retrieved from the second and subsequent recordings are within tolerances as compared to fixed standards. In other words, it is conceivable that for a particular recordingg process, the test results of analyzing a particular parameter is within extremely tight limits and of more optimum value than industry standards requires. As a result, the signature will reflect an unusually high standard for that particular parameter. This is a result of setting the limits on the basis of prior test results and not industry standards. Thus, As some part of the recording process degrades, for example, in the production of the tape itself, evaluator 171 may fail a tested unit because the parameter of interest lies outside the limits set by limits setter 166, even though analysis of that parameter shows that it is within acceptable industry standards according to standards table 162. Knowing the relationship between the manufacturing process for the tape and the particular parameter tested, immediate corrective action can be taken. Otherwise, such a defect, especially in combination with other defects, could render the product (tape in this example) unusable, and such knowledge would come to the attention of the manufacturer after the fact, i.e., after receiving many compliants by its customers.

Details of the functional blocks in FIG. 24 after analyzer 158 are not given in this description, since it should be clear to one skilled in the art what kind of off-the-shelf components should be selected to make and use the same. For example, standards table 162 can be in the form of any of a variety of available read-only memory devices, parameter list 164 and signature store 168 can be random access memory devices, and limits setter 166 could be in the form of a simplified microprocessor which applies percentage limits or plus and minus values from a particular value entered. Evaluator 171 may be implemented in some form of sophisticated comparator in which each of a large number of parameter values from analyzer 158 is compared with a pair of numbers for each such value stored in signature store 168, the two values from signature store 168 being upper and lower limits within which the parameter being evaluated must fall. The evaluation output signal is then a printed table of data showing a list of parameters, the tolerances established by limits setter 166, the value of each parameter being evaluated by evaluator 171, and out-of-tolerance limits information. A sample of a table so constructed is shown in Tables I, II and III which are more closely associated with the "disc evaluation" shown in FIG. 25.

Referring to FIG. 25, the "disc evaluation" scheme is represented. Here, the same components are shown as were shown in FIG. 24 with the addition of the disc mastering recorder 173 and associated functional blocks. In this scheme, evaluator 171 evaluates the tape signature stored in signature store 168 relative to the corresponding disc signature stored in signature store 231. When pre-mastering tape 154 is played in player 156, assuming that a tape "signature" has been acquired as described in connection with FIG. 24, the program material and test tones are transferred to video disc 177 by disc mastering recorder 173. It is to be noted that both lead-in and lead-out signals are transferred to the video disc 177 along with program material in order that analysis of a disc can be performed using the same test signal sources as those associated with the pre-mastering tape. Blocks 217 through 223 represents the major process steps in the production of a video disc from exposure and development in block 217 through applying adhesive and putting together the two disc halves to form a completed two-sided disc in block 223. A disc player 224 then plays the completed disc, and the results are analyzed in analyzer 226 in a manner similar to that of analyzer 158. Again, it is preferable to compare the output of analyzer 226 with fixed standards from a standard's table 227 in a comparator 225. This kind of preliminary checking eliminates those discs which might contain defects causing the parameters tested to be very far out of acceptable industry standard limits. Additionally, and common to all evaluation schemes in FIGS. 24-27, performing this initial analysis against "world" standards is a check on the quality of a customer's original material, and this can be of great benefit when deviations from such "world" standards can be detected early, e.g., before disc mastering is initiated.

In any event, assuming the results of analyzer 226 are tolerable against fixed industry standards, the analyzer results are sent to signature table 229 and stored in signature store 231. Recalling that the lead-in and lead-out test tones are accumulated in real time in less than one-half second and that certain audio and video tests are performed on the active program material, under manual or computer control, evaluator 171 recalls the tape signature from store 168 and the disc signature from store 231 and compares parameter-for-parameter the two signatures. Again, a visual display or hard print readout is available to show how well the particular disc has performed against its pre-mastering counterpart (reference again Tables I, II and III).

The importance of measuring of measuring like parts of the copy and master has been mentioned previously, and the logic and wisdom of this is rather obvious. Accordingly, in addition to the "signature" containing parameter analysis results and tolerance range limits, it is essential that the "tape signature" comprise in its make-up the particular frame numbers at which video and audio active program analysis is to take place. In this manner, the "personality" of a "signature" is totally characterized with all of the information to make a signature comparison at any time and at any step in the process, in FIG. 25, for example, the master disc has a photoresist layer at point A in the process, is exposed and developed at point B, metalized at point C, made into a stamper at point D to produce a one-sided (1X) plastic replica at point E, provided with a reflective coating at point F, and a protective coating at point G, and finally, combined with a second-half disc to form a completed disc (2X) at point H.

It is important to note at this point that, as with any replicating process, some degradation of the program material through each step of the process can be expected at points A-H. Furthermore, the degradation to be expected between points A and B may be less than that expected between points B and C, etc. Accordingly, an application of the present invention concerns playing the disc from any point in the process and establishing a "signature" for each of the points A through H. The invention thus provides substantially "real-time" evaluation for correlation with "in process" activities to cause supervisorial personnel to shut down or modify equipment before any great loss of material and employee time. Additionally, out-of-tolerance parameter trends can be readily sensed, and the information gathered by comparing process signatures at each step in the process, so as to improve specific manufacturing processes or process steps due to the highly accurate and repetitive objective testing capabilities that "signature" testing provides. Such trend information can be used to foresee potential problems, even though on an absolute scale, the parameters tested are within acceptable limits. Finally, by varying the process parameters at each major step in the process, product improvement can be enhanced by observing the "signature" comparisons when temperatures, pressures, process times, etc., are varied.

Concerning "disc evaluation", in view of the fact that video disc players are of recent design, the present invention can be used in evaluating player consistency. For example, instead of changing discs in FIG. 25, the same disc can be played back on a number of disc players 224, and a "signature" of the players can be developed and compared with the "signature" established from a known good player.

The use of this invention with "throughput" devices, such as audio and video amplifiers and special effects devices, i.e., echo units, distribution amplifiers, limiters, and the like, has been mentioned earlier. Since information can be deposited on a recording medium, and the invention can recover and make performance tests on the recovered information, it is equally possible to extend the practical application of this invention to such throughput devices by merely applying the test signals that would normally be recorded on a recording medium to the input of the throughput device, sensing the output of the throughput device in substitution for the signals normally recovered from the recording medium, and making the same comparisons that would be made to evaluate the quality of signal transfer in the record/playback process. Thus, various electrical characteristics of the throughout device can be measured and automatically analyzed and evaluated. FIG. 26 shows such a scheme.

Since the evaluation procedure requires preparing a "signature" of a throughout reference unit 234, a separate path for a throughput under test 235 is shown in FIG. 26. The unit under test is shown to have its own analyzer 226, signature table 229, and signature store 231. Of course, in the interest of economy, a scheme similar to that of FIG. 224 could also have been used, wherein analyzer 158 could be time shared with the referenced unit 234 and unit under test 235. In such a case, analyzer 226, signature table 229, and signature store 231 would be unnecessary.

Likewise, in case of need, rather than taking the output of analyzer 158 in FIG. 24 directly to evaluator 171, a separate analyzer, signature table, and signature store as in FIG. 26 could have been used.

TABLE I

| AUDIO/VIDEO QUALITY MONITORING SYSTEM AUDIO DATA ANALYSIS FOR DISC | | | | | TIME: 16:01:52 DATE: 12/30/81 | | |
|---|---|---|---|---|---|---|---|
| DISC ID - 050148010 | | LOWER | | UPPER | LOWER | | UPPER |
| AUDIO TEST (LEAD IN) | UNITS | TAPE 1 | CH1 DISC | TAPE 1 | TAPE 2 | CH2 DISC | TAPE 2 |
| TEST FRAME 1 | | | | | | | |
| FREQUENCY | HZ | 900.00 | 991 | 1100.00 | 900.00 | 999 | 1100.00 |
| AC LEVEL | DBV | −12.21 | −7.79 | −4.07 | −12.11 | −9.07 | −4.07 |
| SINAD | DB | 22.70 | 28.28 | 34.06 | 12.00 | 13.00 | 11.00 |
| SINAD WITH FILTER | DB | 27.94 | 31.04 | 34.14 | 14.40 | 16.00 | 17.67 |
| TOTAL HARMONIC DISTORTION | V | 1.80 | 3.8 | 2.20 | 2.43 | 18.1 | 2.97 |
| DC LEVEL | VOLTS | −.01 | −.008 | −.01 | .03 | .029 | .01 |
| PHASE ANGLE AT 1 KHZ | DEG | 2.61 | 1.57 | 2.61 | 2.03 | 1.07 | 2.01 |
| TEST FRAMES 2 AND 3 CROSSTALK | | | | | | | |
| CROSSTALK FREQUENCY | HZ | 831.25 | 904 | 918.75 | 38.95 | 41 | 43.05 |
| CROSSTALK AC LEVEL | DB | −39.87 | −28.36 | −32.63 | −39.02 | −36.44 | −31.92 |
| TEST FRAME 4 AND 7 | | | | | | | |
| SIGNAL/NOISE RATIO | DB | 41.43 | 38.85 | 50.63 | 33.03 | 37.09 | 40.37 |
| SIGNAL/NOISE RATIO WITH FILTER | DB | 50.57 | 47.56 | 61.81 | 44.02 | 48.18 | 58.80 |
| TEST FRAMES 5 AND 6 INTERMODULATION DISTORTION | | | | | | | |

TABLE I-continued

AUDIO/VIDEO QUALITY MONITORING SYSTEM
AUDIO DATA ANALYSIS FOR DISC

TIME: 16:01:52  
DATE: 12/30/81  
DISC ID - 050148010

| AUDIO TEST (LEAD IN) | UNITS | LOWER TAPE 1 | CH1 DISC | UPPER TAPE 1 | LOWER TAPE 2 | CH2 DISC | UPPER TAPE 2 |
|---|---|---|---|---|---|---|---|
| AMPLITUDE 7KHZ | DB | −21.34 | −19.4 | −17.46 | −23.65 | −21.5 | −19.33 |
| AMPLITUDE 7KHZ + 60 HZ | DB | −52.14 | −46.6 | −42.66 | −51.81 | −46.0 | −42.39 |
| AMPLITUDE 7KHZ − 60 HZ | DB | −47.63 | −43.1 | −38.97 | −50.05 | −45.0 | −40.95 |
| TEST FRAMES 8 THROUGH 12 | | | | | | | |
| FREQUENCY RESPONSE AT −15 DB | | | | | | | |
| −3 DB AUDIO BANDWIDTH (KHZ) | | | | | | | |

TABLE II

AUDIO/VIDEO QUALITY MONITORING SYSTEM
AUDIO DATA ANALYSIS FOR DISC

TIME: 16:01:52  
DATE: 050148010  
DISC ID - 050148010

| AUDIO TEST (LEAD IN) | UNITS | LOWER TAPE 1 | CH1 DISC | UPPER TAPE 1 | LOWER TAPE 2 | CH2 DISC | UPPER TAPE 2 |
|---|---|---|---|---|---|---|---|
| TEST FRAME 1 | | | | | | | |
| FREQUENCY | HZ | 900.00 | 990 | 1100.00 | 900.00 | 991 | 1100.00 |
| AC LEVEL | DBV | .18 | .38 | .53 | −11.75 | −7.79 | −9.12 |
| SINAD | DB | 20.14 | 27.17 | 30.20 | 21.03 | 26.42 | 31.35 |
| SINAD WITH FILTER | DB | 24.45 | 29.27 | 29.89 | 25.73 | 28.79 | 31.45 |
| TOTAL HARMONIC DISTORTION | V | 2.16 | 4.4 | 2.64 | 2.07 | 4.8 | 2.38 |
| DC LEVEL | VOLTS | −.01 | −.007 | −.01 | .02 | .024 | .03 |
| PHASE ANGLE AT 1 KHZ | DEG | 5.76 | 5.28 | 5.76 | 2.03 | 2.03 | 2.03 |
| TEST FRAMES 2 AND 3 | | | | | | | |
| CROSSTALK | | | | | | | |
| CROSSTALK FREQUENCY | HZ | 710.60 | 913 | 785.40 | 38.95 | 149 | 48.05 |
| CROSSTALK AC LEVEL | DB | −39.64 | −36.56 | −32.44 | −35.05 | −34.62 | −28.67 |
| TEST FRAME 4 AND 7 | | | | | | | |
| SIGNAL/NOISE RATIO | DB | 40.70 | 37.41 | 49.74 | 42.54 | 35.34 | 32.00 |
| SIGNAL/NOISE RATIO WITH FILTER | DB | 47.40 | 46.27 | 57.94 | 50.00 | 47.59 | 61.12 |
| TEST FRAMES 5 AND 6 | | | | | | | |
| INTERMODULATION DISTORTION | | | | | | | |
| AMPLITUDE 7KHZ | DB | −22.22 | −20.1 | −18.18 | −23.21 | −21.1 | −18.97 |
| AMPLITUDE 7KHZ + 60 HZ | DB | −43.34 | −39.0 | −35.45 | −45.76 | −41.4 | −37.44 |
| AMPLITUDE 7KHZ − 60 HZ | DB | −42.90 | −38.3 | −35.10 | −45.54 | −40.2 | −37.26 |
| TEST FRAMES 8 THROUGH 12 | | | | | | | |
| FREQUENCY RESPONSE AT −15 DB | | | | | | | |
| −3 DB AUDIO BANDWIDTH (KHZ) | | | | | | | |

TABLE III

AUDIO/VIDEO QUALITY MONITORING SYSTEM
VIDEO DATA ANALYSIS FOR DISC

TIME: 15:54:37  
DATE: 12/30/81  
DISC ID - 050148010001

| STARTING FRAME # | | UNITS | TAPE LOWER | DISC ACTUAL | TAPE UPPER | TAPE ACTUAL | EXCEPTION |
|---|---|---|---|---|---|---|---|
| 810 | AVG PIC LEVEL | % FRAME | 19.80 | 22.00 | 24.20 | 22.00 | |
| | COMPOSITE VITS | | | | | | |
| | BAR AMP | IRE | 95.95 | 100.00 | 106.05 | 101.00 | |
| | SYNC AMP | % BAR | −39.05 | −35.00 | −31.95 | −35.50 | |
| | BURST AMP | % BAR | 10.70 | 24.40 | 32.10 | 21.40 | |
| | CHRO-LUM GAIN | % | −39.00 | −25.50 | −13.00 | −26.80 | |
| | RELATIVE BURST GAIN | % | 2.70 | 16.10 | 8.10 | 6.40 | *** |
| | RELATIVE BURST PHASE | DEG | 3.50 | 25.89 | 10.50 | 7.00 | *** |
| | DIFF GAIN | % | 12.10 | 38.80 | 36.30 | 24.20 | *** |
| | DIFF PHASE | DEG | 4.59 | 17.30 | 5.61 | 5.10 | *** |
| | LUM NON-LINEAR DISTORTION | % | 5.75 | 17.30 | 17.25 | 11.60 | *** |
| | CHRO-LUM DELAY | NSEC | 57.60 | 120.00 | 172.50 | 115.00 | |
| | LINE-TIME DIST | % | 2.16 | 2.70 | 3.24 | 2.70 | |
| | PULSE TO BAR RATIO | % | 2.79 | 3.90 | 3.41 | 3.10 | *** |
| | 2T-PULSE RINGING | % KF | 1.75 | 3.40 | 9.25 | 3.50 | |
| | T-STEP RINGING LO | % BAR | 11.00 | 26.40 | 33.00 | 22.00 | |
| | T-STEP RINGING TR | % BAR | 8.50 | 16.40 | 25.60 | 17.00 | |
| | COMBINATION VITS | | | | | | |
| | WHITE FLAG AMP | IRE | 98.83 | 99.90 | 108.57 | 98.70 | |
| | MM 600 MHZ | % FLAG | 45.90 | 53.00 | 62.10 | 54.00 | |
| | MM 1.0 MHZ | % FLAG | 39.09 | 49.00 | 54.05 | 47.00 | |
| | MM 2.0 MHZ | % FLAG | 39.10 | 45.00 | 52.90 | 46.00 | |
| | MM 3.0 MHZ | % FLAG | 35.70 | 42.00 | 48.30 | 42.00 | |
| | MM 3.58 MHZ | % FLAG | 28.90 | 29.00 | 39.10 | 34.00 | |
| | MM 6.2 MHZ | % FLAG | 16.70 | 21.00 | 25.30 | 22.00 | |
| | CHRO NON-LIN GAIN 20 IRE CHROMA | IRE | 20.43 | 18.70 | 24.97 | 22.70 | *** |
| | CHRO NON-LIN GAIN 80 IRE CHROMA | IRE | 38.43 | 39.20 | 45.97 | 42.70 | |
| | CHRO NON-LIN PHASE | UFG | 95.15 | 177.00 | 285.45 | 190.30 | |
| | CHRO-LUM INTERMOD | IRE | .45 | .80 | 1.35 | .90 | |

TABLE III-continued

| AUDIO/VIDEO QUALITY MONITORING SYSTEM VIDEO DATA ANALYSIS FOR DISC | | | | | | |
|---|---|---|---|---|---|---|
| STARTING FRAME # | DISC ID - 050148010001 | TAPE UNITS | DISC LOWER | TAPE ACTUAL | TAPE UPPER | TAPE ACTUAL | EXCEPTION |

TIME: 15:54:37  
DATE: 12/30/81

| | | TAPE UNITS | DISC LOWER | TAPE ACTUAL | TAPE UPPER | TAPE ACTUAL | EXCEPTION |
|---|---|---|---|---|---|---|---|
| | VIRS | | | | | | |
| | VIRS SET UP LEVEL | IRE | 3.55 | 6.80 | 10.65 | 7.10 | |
| | VIRS BLANKING LEVEL | % CARR | | | | | |
| | VIRS WHITE LEVEL | % CARR | | | | | |
| | HORIZ BLANKING WIDTH | USEC | 10.22 | 11.33 | 12.48 | 11.35 | |
| | HORIZ SYNC WIDTH | USEC | 4.29 | 4.69 | 5.23 | 4.76 | |
| | HORIZ SYNC RISE TIME | NSEC | 140.00 | 250.00 | 420.00 | 280.00 | |
| | HORIZ SYNC FALL TIME | NSEC | 24.64 | 180.00 | 78.92 | 49.23 | *** |
| | SYNC SETUP | USEC | 8.68 | 9.53 | 10.60 | 9.64 | |
| | FRONT PORCH DURATION | USEC | 1.28 | 1.49 | 1.56 | 1.42 | |
| | SYNC TO BURST START DURATION | USEC | 4.96 | 5.43 | 6.06 | 5.51 | |
| | COLOR BURST WIDTH | CYCLFS | 4.10 | 8.40 | 9.90 | 9.00 | |
| | MISCELLANEOUS | | | | | | |
| | VERTICAL BLANKING WIDTH FLD 1 | LINES | 16.92 | 18.79 | 20.66 | 18.79 | |
| | VERTICAL BLANKING WIDTH FLD 2 | LINES | 16.92 | 18.79 | 20.66 | 18.79 | |
| | EQUALIZING PULSE WIDTH | USEC | 2.07 | 2.30 | 2.63 | 2.30 | |
| | SEPRATION WIDTH | USEC | 4.14 | 4.65 | 5.06 | 4.60 | |
| | SIGNAL TO NOISE-FRAME | DB | −63.45 | −33.94 | −21.15 | −42.30 | |
| | SIGNAL TO NOISE-FIELD 1 | DB | −63.36 | −33.97 | −20.96 | −41.71 | |
| | SIGNAL TO NOISE-FIELD 2 | DB | −63.90 | −33.90 | −21.30 | −42.60 | |

Finally, FIG. 27 illustrates the manner in which digital signature evaluation is accomplished. The same analogy follows in this figure insofar as forming a signature in store 168. However, whether the signal to be evaluated is audio or video, a player, termed device under test 238, outputs its signal to the A/V converter 237, and the digital form of the signal is stored in digital memory 233. If necessary, as was with the audio test tones during lead-in and lead-out, a recirculate control 240 feeds back the selected digital portion of the stored signal in a loop around fashion so as to output a continuous verion of the stored signal to D/A converter 239. The analog version of the signal is then analyzed in analyzer 226, a signature table is established, and the analyzing results are stored in signature store 231 for later evaluation in comparator 171.

Table I is a printout of the results of "signature" evaluation during lead-in of a video disc. The selected parameters analyzed for the disc example used are listed in the lefthand column, and the "signature" comparison is shown in the two groups of three columns each, one group for audio channel 1 and another group for audio channel 2. The center column for each channel lists the value of the disc analysis measurement for each parameter, while the two values on either side of the center column indicate the "signature" limits set by limits setter 166 of FIG. 25.

Table II shows similar evaluation comparison results for lead-out of the disc under test.

In like manner, Table III shows the video evaluation test results. Here, an additional column of information is shown, that of the actual tape analysis measurements from which upper and lower limits for the "signature" comparison were generated in limits setter block 166.

Another application for the present invention concerns video disc mastering machines known in the art as direct-read-after-write machines. An example of such a mastering machine can be found in U.S. Pat. No. 4,225,873, issued Sept. 30, 1980, filed Feb. 20, 1973, to Winslow. A direct-read-after-write disc is known from U.S. Pat. No. 4,264,911, issued Apr. 28, 1981, filed Aug. 20, 1979, to Wikinson. In such a system, a high-powered laser beam is focused through an objective lens and split into two paths. A high-powered laser beam path is used to "burn" holes in a metallic coating on the disc surface, while the second, lower-powered beam path is directed downstream of the direction of movement of the disc and is used as a read beam for immediately reading the information recorded by the high-powered beam. Since the beam points of impact on the disc are separated by only a few microns, and with the disc rotating at 1800 rpm, a substantially simultaneous signal can be retrieved as the disc is being "written". Since audio test tones in lead-in are recovered in less than one-half second, and since analysis of the active audio and active video portions of the program material commence (or can commence) at frame 1, when comparing the output signal developed by the low power laser beam with a previously derived signature from the pre-mastering tape, in the event that blemishes are encountered in the process of recording the disc, such defects can be substantially instantaneously derived so as to eliminate the need for wastefully proceeding with perhaps a further one hour of recording time.

In this connection, the twelve segments of audio lead-in tones are retrieved at the rate of 30 segments per second (vertical frame rate), and instruments such as the Hewlett Packard 8903A Audio Analyzer are available which can measure a given parameter in typically 2.5 seconds or less. Since each segment of the lead-in test tones is used for more than one audio measurement, it is recirculated, as explained earlier, to produce a continuous version thereof for the length of time necessary to perofrm all audio measurements by the analyzer before going on to retrieving and continuously looping the second test segment. The table below, Table IV, indicates which audio measurements are made in each test frame.

TABLE IV

TEST FRAME 1

Frequency  
AC Level  
AC Level With Filter  
SINAD  
Distortion  
DC Level  
Distortion Level  
Distortion Level With Filter  
SINAD With Filter  
Signal/Noise Ratio TABLE IV-continued Signal/Noise Ratio With Filter
TEST FRAMES 2 AND 3
Frequency
A/C Level
TEST FRAMES 4 AND 7
Frequency
Distortion
Distortion Level
Distortion Level With Filter
Signal/Noise Ratio
Signal/Noise Ratio with Filter
TEST FRAMES 5 AND 6
Amplitude 7kHZ
Amplitude 7kHZ + 60HZ
Amplitude 7kHZ − 60HZ
TEST FRAMES 8-12
Frequency Response Since the largest number of measurements made at any one test frame (test frame 1) is 11, and since the available analyzer can perform its analysis in 2.5 seconds or less, the maximum length of time necessary for the analyzer to make all measurements in test frame 1 is about 27.5 seconds. Accordingly, the recirculate control 99 shown in FIGS. 9 and 12 need only recirculate the tone segment for a maximum time of 27.5 seconds. Furthermore, and although the present invention is not limited to the specific tests listed above, to complete all 23 audio test measurements would require no more than 57.5 seconds. Conservatively then, the repetition rate at which the complete audio measurement cycle is repeated can conservatively be one cycle every minute. Then, since the longest active program test is the mono/non-mono check, and since this check can be completed each 65.5 seconds, it is clear that advantage can be taken of the AVQMS system to weed out defective discs in only a few minutes of recording/playing time. This concept can be carried out on video discs produced by the method illustrated in FIG. 25 (as opposed to the direct read-after-write process) so as to be able to detect defective discs at any point along the process in only a few minutes. Of course, defects not contained close to the lead-in portion of the disc being evaluated will not show up instantaneously, but process defects which cause uniform parameter degradation throughout the video disc will be caught in the first couple of minutes of playing time. Furthermore, the speed at which information can be analyzed with the AVQMS eliminates much time taken in manually observing and/or manually taking measurements under prior techniques. Then again, all subjective evaluation of the disc is eliminated.

A finer point of distinction between objective testing and subjective testing can be appreciated from the fact that at certain points in the process of producing a disc in accordance with FIG. 26, it may be expected that the parameters being tested will not be subjectively acceptable, but will be objectively acceptable. This is best explained with reference to the fact that after exposing and developing in block 217 of FIG. 25, the disc produced at point B in the process is substantially clear, being comprised of a glass substraight and developed photo resist material. When bombarding the disc surface with a read laser beam for purposes of developing a signal therefrom, it can be appreciated that the contrast between exposed and non-exposed portions of the disc surface is not great, especially as compared with a final disc surface which contains a highly reflective metal coating for reflecting a substantial portion of the read beam back from the planar surfaces and scattering a substantial portion in the non-planar portions. Accordingly, in reading the disc at point B in the process, a smaller signal-to-ratio in both audio and video measurements can be expected. However, since the system according to the present invention can develop its own "signature", acceptable signal/noise figures can be extrapolated from expected final results to gauge the acceptable limits for the earlier steps in the process. Thus, a low signal-to-noise ratio at Point B is predictable and acceptable for that particular point in the process, even though the signal-to-noise figure measured would not fall within an acceptable range for the final product.

Only preferred embodiments of the invention have been described above. One skilled in the art, however, will recognize that where audio signal measurements were made in the manner of FIGS. 7–12, clearly video signal measurements, custom or standard, can be performed in a similar manner. That is, the present state of the art of video processing includes digitizing video signals, storing same, and reading out the stored signals at will. An example is the broadcast quality Time Base Correctors available from many different manufacturers. Thus, recording short segments of video test signals during lead-in and lead-out, playing them back in real-time, storing the retrieved signals digitally, recalling a selected segment and recirculating if for purposes of creating a continuous representation of the selected segment for analysis and evaluation, are techniques well within the restraints of present technology once the artisan has disclosure of the present invention before him or her. Accordingly, the manner of multiplexing and subsequent analyzing of the audio lead-in and lead-out tones are to be taken as representing a preferred form of the invention, and the blocks labelled with "audio" designations merely need being renamed to illustrate the equivalent manner of multiplexing and subsequent analyzing of the lead-in and lead-out for video qualities (with appropriate changes of signal sources and timing figures, of course.)

Similarly, the manner in which video parameter analysis and evaluation have been described herein could, with like analogy, apply to the analysis and evaluation of audio parameters.

While the invention has been particularly shown and described with reference to a preferred embodiment and alterations thereto, it is to be understood by those skilled in the art that various changes in form and detail may be made therein without departing from the spirit and scope of the invention.

I claim:

1. A method of establishing the characteristics of a program of recorded information previously recorded on two channels of a recording medium, comprising the steps of:
 (a) sampling the audio waveform amplitude of audio information contained on each channel of the recorded program;
 (b) comparing the amplitudes of said information sampled from one channel with the amplitudes of information occurring simultaneously with that sampled from the other channel; and
 (c) counting the number of times that the amplitudes of the samples from the two channels are within a prescribed percentage tolerance of one another to provide information regarding whether or not the signals on the two channels are substantially similar in informational content.

2. Apparatus for establishing the characteristics of a program of recorded information previously recorded on two channels of a recording medium, comprising:
   (a) means for sampling the audio waveform amplitude of audio information contained on both channels of the recorded program;
   (b) comparison means for comparing the amplitudes of said sampled information from one channel with the amplitudes of sampled information occurring simultaneously with and sampled from the other channel; and
   (c) a counter for counting the number of times that the amplitudes of the samples from the two channels are within a prescribed percentage tolerance of one another to provide information regarding whether or not the signals on the two channels are substantially similar in informational content.

3. The apparatus as claimed in claim 2, wherein said comparison means includes:
   (a) means for continuously comparing the amplitude of information from of said channels with that of the other of said channels; and
   (b) timing means for clocking at regular intervals the comparison results between the two channels of information; and
   (c) said counter includes:
      (i) means for counting the successful comparisons for which the two channels of information are within said prescribed percentage tolerance;
      (ii) output means for outputting a total tabulation of the number of counts; and
      (iii) means for indicating, after a fixed number of comparisons, the number of successful counts, thereby indicating as to whether or not the signals on the two channels are substantially similar in informational content.

4. The apparatus as claimed in claim 3, wherein the number of sampling comparisons is 65,536, and for means for performing amplitude comparisons effects comparisons at one millisecond intervals.

5. A method of establishing the characteristics of a program of recorded information previously recorded on two tracks of a recording medium, comprising the steps of:
   (a) sampling the audio waveform amplitude of audio information contained on each track of the recorded program;
   (b) continuously comparing the amplitudes of said information sampled from one track with the amplitudes of information occurring simultaneously with that sampled from the other track;
   (c) clocking at regular intervals the comparison results between the two tracks of information; and
   (d) counting the number of times that the amplitudes of the samples from the two tracks are within a prescribed percentage tolerance of one another to provide information regarding whether or not the signals on the two tracks are substantially similar or not in informational content; and wherein said counting step includes:
      (i) counting the successful comparisons for which the two tracks of information are within said prescribed percentage tolerance; and
      (ii) outputting a total tabulation of the number of counts, whereby after a fixed number of comparisons, the number of successful counts gives an indication as to whether or not the signals on the two tracks are substantially similar or not in informational content.

6. Apparatus for establishing the characteristics of a program of recorded information previously recorded on two tracks of a recording medium, comprising:
   (a) means for sampling the audio waveform amplitude of audio information contained on both tracks of the recorded program;
   (b) timing means for clocking at regular intervals the comparison results between the two tracks of information;
   (c) comparison means for continuously comparing the amplitudes of said sampled information from one track with the amplitudes of sampled information occurring simultaneously with and sampled from the other track; and
   (d) a counter for counting the number of times that the amplitudes of the samples from the two tracks are within a prescribed percentage tolerance of one another to provide information regarding whether or not the signals on the two tracks are substantially similar in informational content, said counter comprising:
      (i) means for counting the successful comparisons for which the two tracks of information are within said prescribed percentage tolerance;
      (ii) output means for outputting a total tabulation of the number of counts; and
      (iii) means for indicating, after a fixed number of comparisons, the number of successful counts, thereby indicating as to whether or not the signals on the two tracks are substantially similar in informational content.

* * * * *